(12) United States Patent
Akiyama

(10) Patent No.: US 9,014,572 B2
(45) Date of Patent: Apr. 21, 2015

(54) OPTICAL TRANSMITTER, CONTROL METHOD FOR THE SAME, AND OPTICAL TRANSMISSION SYSTEM

(75) Inventor: Yuichi Akiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 327 days.

(21) Appl. No.: 13/436,780

(22) Filed: Mar. 30, 2012

(65) Prior Publication Data

US 2012/0308240 A1 Dec. 6, 2012

(30) Foreign Application Priority Data

May 30, 2011 (JP) ................................ 2011-121047

(51) Int. Cl.
- H04B 10/12 (2006.01)
- H04B 10/50 (2013.01)
- H04B 10/00 (2013.01)

(52) U.S. Cl.
CPC ...... H04B 10/5053 (2013.01); H04B 10/50575 (2013.01)

(58) Field of Classification Search
CPC .................. H04B 10/5057; H04B 10/50572; H04B 10/50575; H04B 10/50577
USPC .................. 398/195, 197, 198, 192
See application file for complete search history.

(56) References Cited

U.S. PATENT DOCUMENTS

| | | | |
|---|---|---|---|
| 6,278,539 | B1 | 8/2001 | Ooi et al. |
| 7,657,190 | B2 | 2/2010 | Akiyama |
| 7,848,659 | B2 | 12/2010 | Miura et al. |
| 2006/0263098 | A1 * | 11/2006 | Akiyama et al. .............. 398/188 |
| 2007/0177882 | A1 | 8/2007 | Akiyama |
| 2008/0187324 | A1 | 8/2008 | Akiyama et al. |
| 2010/0098435 | A1 | 4/2010 | Akiyama |
| 2011/0170877 | A1 | 7/2011 | Akiyama |

FOREIGN PATENT DOCUMENTS

| | | |
|---|---|---|
| EP | 2169851 A2 | 3/2010 |
| EP | 2280498 A1 | 2/2011 |
| JP | 2000-162563 | 6/2000 |

(Continued)

OTHER PUBLICATIONS

Extended European Search Report dated Sep. 10, 2012 for corresponding European Application No. 12162482.9.
Extended European Search Report dated Oct. 9, 2012 for corresponding European Application No. 12162482.9.

(Continued)

Primary Examiner — Daniel Dobson
(74) Attorney, Agent, or Firm — Fujitsu Patent Center

(57) ABSTRACT

An optical transmitter includes an optical modulator having first and second waveguides to modulate carrier light at each of the waveguides using a driving signal with 2*n intensity levels (n is an integer 1 or greater); and a phase shifter to cause a phase difference between a first optical signal and a second optical signal output from the first waveguide and the second waveguide, respectively. A photodetector converts a portion of a multilevel optical modulation signal acquired by combining the first optical signal and the second optical signals into an electrical signal. A monitor detects a change in an alternating current component in the detected modulation signal. A controller controls at least one of a first bias voltage and a second bias voltage being supplied to the first waveguide and the second waveguide, respectively, so as to increase the power value of the alternating current component.

19 Claims, 21 Drawing Sheets

(56) References Cited

FOREIGN PATENT DOCUMENTS

| JP | 2005-091517 | 4/2005 |
|----|-------------|--------|
| JP | 2007-082094 | 3/2007 |
| JP | 2007-163941 | 6/2007 |
| JP | 2007-208472 | 8/2007 |
| JP | 2008-197639 | 8/2008 |
| JP | 4657860     | 3/2011 |

OTHER PUBLICATIONS

D. Hillerkuss et al., "Software-Defined Multi-Format Transmitter with Real-Time Signal Processing for up to 160 Gbit/s", SPTuC4, Optical Society of America 2010.

JPOA—Office Action mailed on Dec. 24, 2014 issued for Japanese Patent Application No. 2011-121047, with partial English translation.

* cited by examiner (B) π/2 PHASE SHIFTER BIAS DEVIATION (A) I/Q ARM BIAS DEVIATION

16-QAM FORMAT

LN DRIVE SIGNAL WAVEFORMS

OPTICAL MODULATION SIGNAL WAVEFORMS

64-QAM FORMAT

LN DRIVE SIGNAL WAVE-FORMS

OPTICAL MODU-LATION SIGNAL WAVE-FORMS (B) π/2 PHASE SHIFTER BIAS DEVIATION (A) I/Q ARMS BIAS DEVIATION

OPTICAL TRANSMITTER, CONTROL METHOD FOR THE SAME, AND OPTICAL TRANSMISSION SYSTEM

CROSS REFERENCE TO RELATED APPLICATIONS

This application is based upon and claims the benefit of priority of the prior Japanese Patent Application No. 2011-121047 filed on May 30, 2011, the entire contents of which are incorporated herein by references.

FIELD

The embodiments discussed herein relate to an optical transmitter, its control method, and an optical transmission system.

BACKGROUND

For the next generation long-distance and mass communication system implementation, studies have been made on a technique for providing pre-distortion information to a modulator input signal by digital signal processing at a sender side, or generating a desired multilevel signal by a software defined radio technology (for the latter, see Non-Patent Document 1 listed below).

In a digital signal processing (DSP) based system, transmission signal characteristics can be optimized by performing a process to compensate for signal degradation occurring during transmission, on modulator input signals. However, an optical modulator itself used in a modulation part is generally a conventional modulator (for example, an LN modulator of Mach-Zehnder type) with the power of an optical output changing periodically depending on a drive voltage. Accordingly, degradation of a transmission signal due to drift is still a technical issue to be solved. To solve this problem, automatic bias control (ABC) is employed.

As a modulation control technology corresponding to a modulation scheme such as differential quadrature phase-shift keying (DQPSK), a method for compensating for fluctuation in operating points is known (see, for example, Patent Document 1 listed below). In this method, a low-frequency signal is superimposed on a drive signal being input to an optical modulator, a portion of the optical signal output from the optical modulator is monitored to detect the low-frequency component, and fluctuation in the operating point is compensated for based upon the detected low-frequency component.

FIG. 1 illustrates a configuration of a conventional 16-QAM optical modulation device 1000. Four-level electrical drive signals are generated by a digital signal processor 1001 and digital-analog converters (DAC) 1002 and 1003, and input to the 16-QAM optical modulation device 1000. Carrier light generated at a light source 1007 is modulated by the four-level electrical drive signals. To be more precise, the four-level drive signals are supplied to the I-arm 1008I and the Q-arm 1008Q of an LN modulator 1008, respectively, to drive the LN modulator 1008 at an amplitude of $2\times V\pi$ of the four-level drive signal. A $\pi/2$ phase shifter 1009 gives a $\pi/2$ phase difference between the optical signals from the I-arm 1008I and the Q-arm 1008Q. The optical signals with the phase difference are combined and output as a 16-QAM optical signal.

FIG. 2A and FIG. 2B are diagrams illustrating a method for controlling a bias voltage applied to a LN modulation device 1100 operated at a driving voltage of $2\times V\pi$. This method is applicable to such a modulation scheme that drive voltage/light intensity characteristics of a optical modulator change periodically between peak and trough and modulation is carried out using an electrical signal with an amplitude of $2\times V\pi$ (as illustrated in FIG. 2B). Such modulation scheme includes CSRZ modulation, optical duo-binary modulation, differential phase-shift keying (DPSK), DQPSK, etc.

In FIG. 2A, electrical signals of amplitude $V\pi$ with the sign reversed are inputs through drive circuits 1104 and 1105 to the electrodes of the arm 1108a and the arm 1108b, respectively, of the optical modulator (an LN modulator). The optical modulator 1108 is push-pull driven at the driving amplitude of $2\times V\pi$. A low-frequency signal $f_0$ generated by a low-frequency generator 1115 is applied to the optical modulator 1108 together with a bias voltage. A portion of the output of the optical modulator 1108 is detected at a photodiode 1111 and converted to an electrical signal. A phase comparator 1112 extracts a low-frequency component from the electrical signal through phase comparison with the low-frequency signal $f_0$ and supplies the detected low-frequency component to the bias supply circuit 1113. The bias supply circuit 1113 controls the bias voltage such that the low-frequency component becomes about zero. In this manner, a change in the superimposed low-frequency signal component is detected by synchronous detection to carry out feedback control to bring the bias application to the optimum state.

As illustrated in FIG. 2B, when bias application is in the optimum state "a", namely, when the bias voltage is at a trough of the drive voltage/light intensity characteristics, low-frequency component $f_0$ is not produced in the optical output signal. If the bias voltage deviates from the optimum state to the state "b" or the state "c", the $f_0$ component is produced. Since the phase of the $f_0$ component inverts according to the direction of deviation from the optimum bias point, the direction of deviation can be known by monitoring the phase of the detected $f_0$ component. Then bias is applied so as to correct the deviation to the optimum bias point "a".

However, this method may not be applicable to higher order multilevel modulation formats, such as 16QAM, 64QAM, etc, as described below.

Also, some other bias control techniques are known. In order to maintain behavior at arbitrary operating points other than the maximum and minimum points, inspection light, different from the signal light, is superimposed onto an optical signal being input to a modulator, and the bias voltage applied to the modulator is controlled based upon the modulation state of the inspection light without using a low-frequency signal (see, for example, Patent Document 2 listed below). Another known technique is monitoring a portion of the optical signal output from a modulator to detect a continuing frequency component superimposed onto the signal light and controlling a bias voltage applied to a phase shifter so as to minimize the detected continuing frequency component (see, for example, Patent Document 3 listed below).

PUBLICATION LISTS

Patent Document 1: Japanese Laid-open Patent Publication No. 2000-162563
Patent Document 2: Japanese Laid-open Patent Publication No. 2005-91517
Patent Document 3: Japanese Patent No. 4657860 (Laid-open Patent Publication No. 2007-82094)
Non-Patent Document: Software-Defined Multi-Format Transmitter with Real-Time Signal Processing for up to 160 Gbit/s, SPtuC4, OSA/SPPCom 2010

SUMMARY

According to one aspect of the present disclosure, an optical transmitter includes an optical modulator including a first waveguide and a second waveguide and configured to modulate carrier light with a modulation driving signal having 2*n intensity levels (where n is an integer 1 or greater) at each of the first and second waveguides; a phase shifter configured to cause a predetermined phase difference between a first optical signal output from the first waveguide and a second optical signal output from the second waveguide; a photodetector configured to detect a portion of a multilevel optical modulation signal acquired by combining the first optical signal and the second optical signal having the phase difference and perform optical-to-electrical conversion on the detected modulation signal; a monitor configured to detect a change in an alternating current component in the detected modulation signal; and a controller configured to control at least one of a first bias voltage being supplied to the first waveguide and a second bias voltage being supplied to the second waveguide so as to increase a power value of the alternating current component based upon the change in the alternating current component.

According to another aspect of the present disclosure, a method for controlling an optical transmitter includes modulating light propagating through a first waveguide and a second waveguide of an optical modulator by a modulation driving signal with 2*n intensity levels (where n is an integer 1 or greater); providing a predetermined phase different between a first optical signal output from the first waveguide and a second optical signal output from the second waveguide; detecting a portion of a multilevel optical modulation signal acquired by combining the first optical signal and the second optical signal having the phase difference to perform optical-to-electrical conversion on the detected modulation signal; detecting an alternating current component in the detected modulation signal; and controlling at least one of a first bias voltage being supplied to the first waveguide and a second bias voltage being supplied to the second waveguide so as to increase a power value of the detected alternating current component.

The object and advantages of the invention will be realized and attained by means of the elements and combinations particularly pointed out in the claims.

It is to be understood that both the foregoing general description and the following detailed description are exemplary and explanatory and are not restrictive to the invention as claimed.

DESCRIPTION OF EMBODIMENTS

Figure 1:
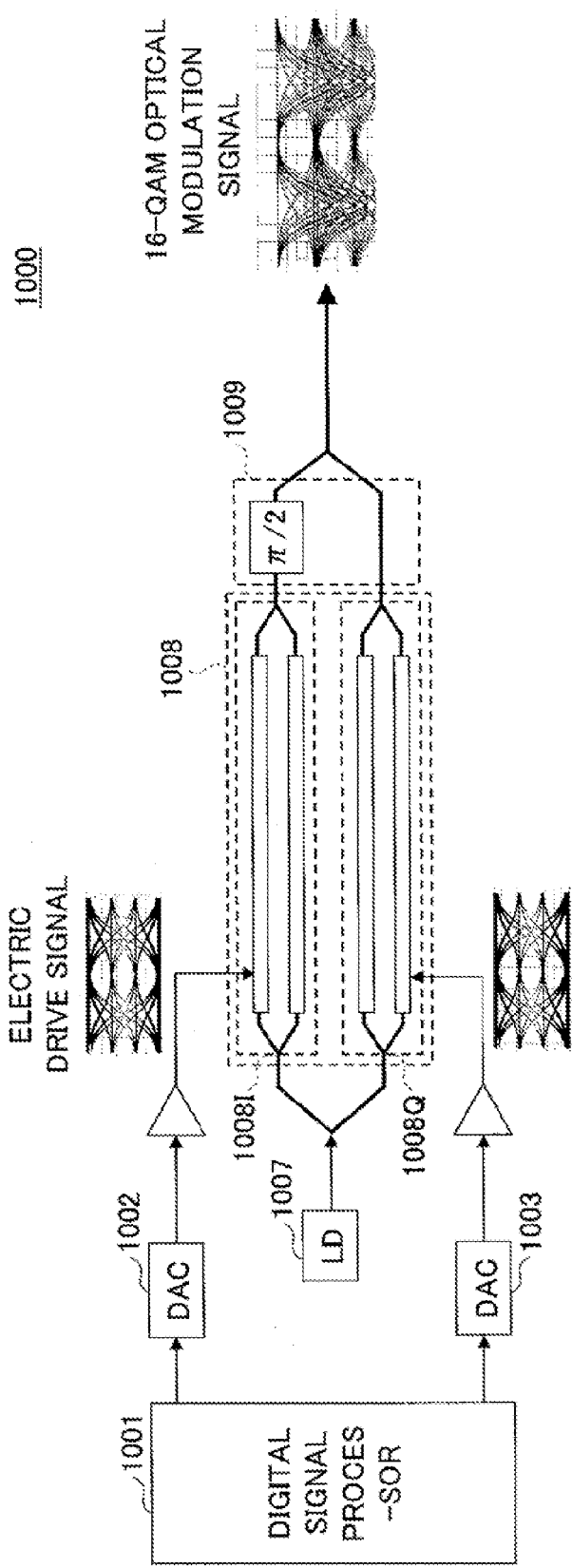
FIG. 1 is a schematic diagram illustrating a configuration of a conventional 16-QAM optical modulation device.
Figure 2A:
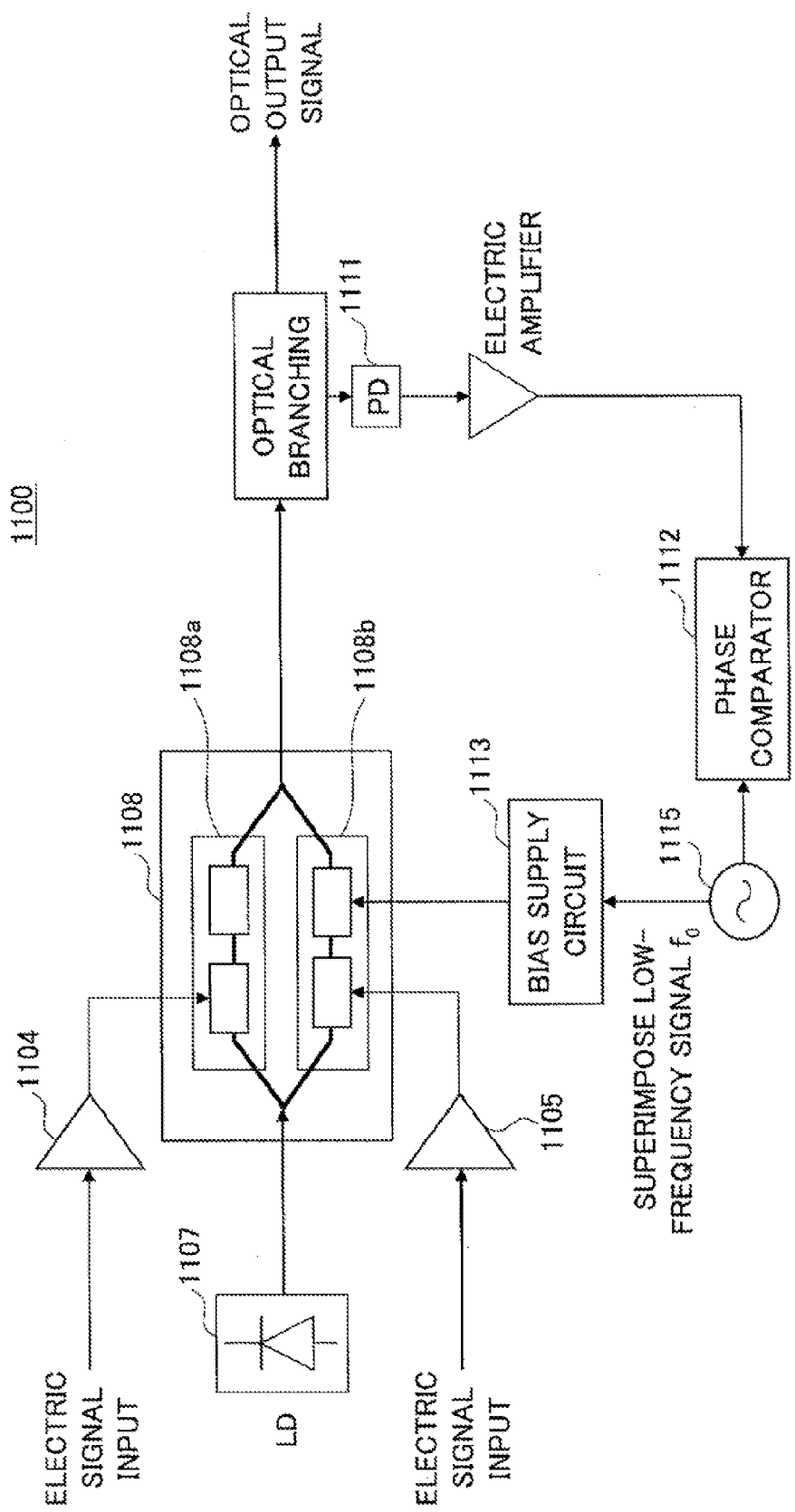
FIG. 2A illustrates a configuration of conventional bias control of an LN modulator driven at amplitude of 2×Vπ.
Figure 2B:
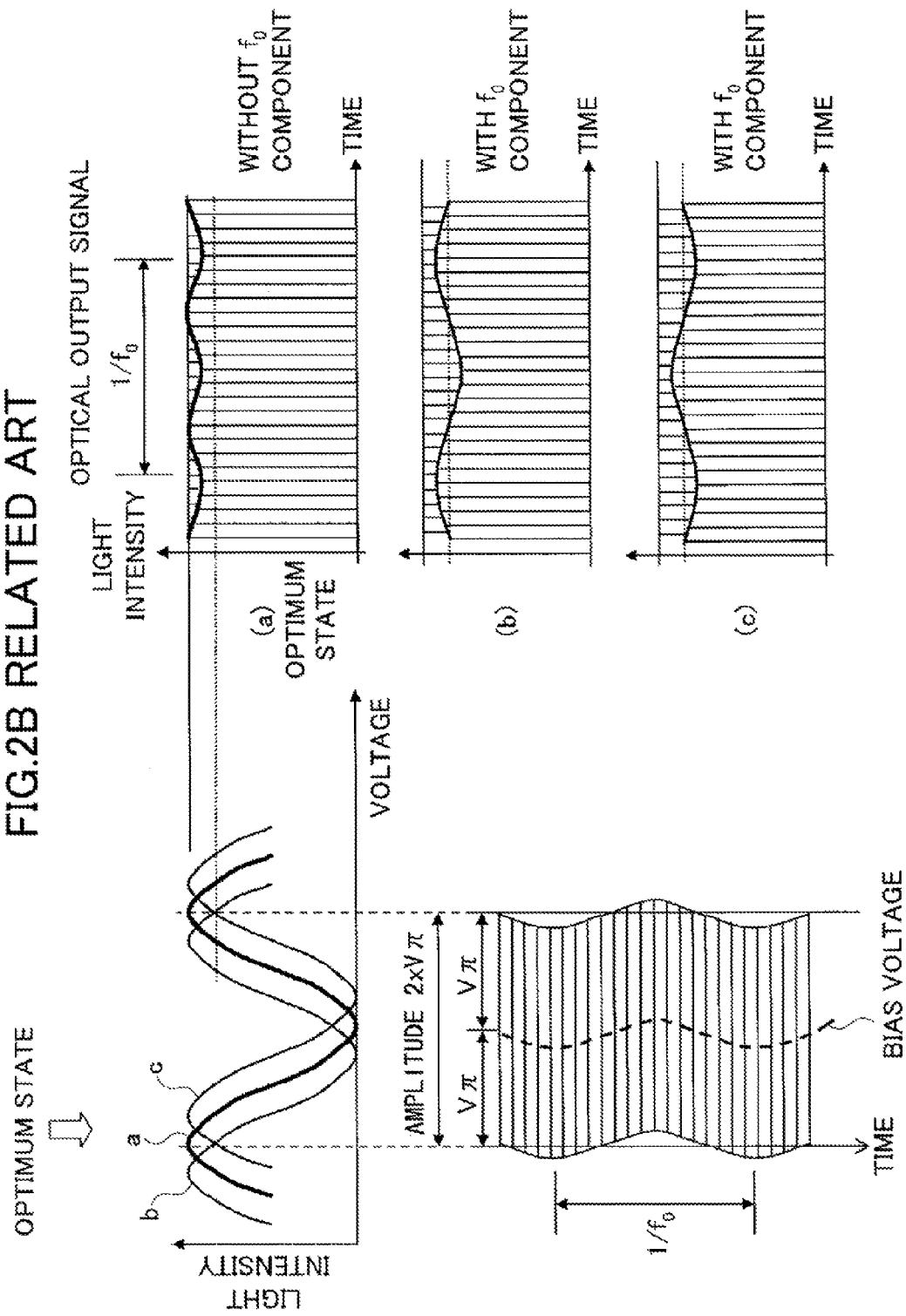
FIG. 2B illustrates the principle of bias control of an LN modulator driven at amplitude of 2×Vπ.
Figure 3:
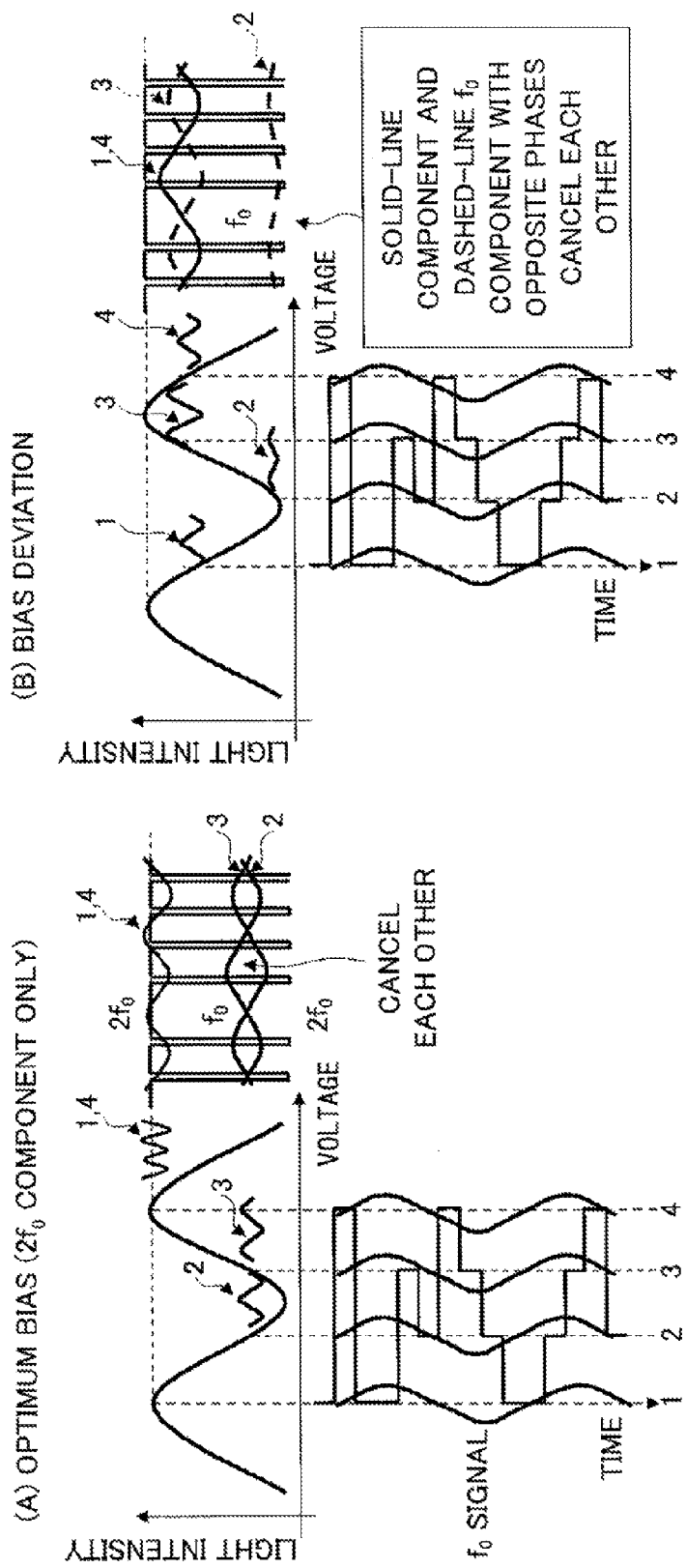
FIG. 3 illustrates problems arising when a conventional bias control method is applied to a 16-QAM modulation scheme.

FIG. 3 illustrates technical problems found by the inventor that may arise when the conventional technique illustrated in FIG. 2A and FIG. 2B is applied as it is to a 16-QAM modulation scheme. It is assumed that the levels of a four-level drive signal for 16-QAM modulation are 1, 2, 3 and 4. In 16-QAM modulation, a trough of the drive voltage/light intensity characteristics of an LN modulator corresponds to the optimum bias point. In part (A) of FIG. 3, the bias state is in the optimum state, where a $2f_0$ component (generated at the optimum point) appears at levels of drive signals 1 and 4. An $f_0$ component is generated at mid level 2 and mid level 3 in a middle level. The $f_0$ components at mid levels 2 and 3 are in opposite phases and cancel each other. Accordingly, only the $2f_0$ component is generated at the optimum bias state.

On the other hand, in the state in which the bias voltage (i.e., the center of the amplitude 2×Vπ) is deviated from a trough of the drive voltage/light intensity signal characteristic (named a "bias deviation state") illustrated in part (B) of FIG. 3, $f_0$ components are generated also at levels 1 and 4 of the drive signal. However, the $f_0$ components represented by the solid line generated at levels 1 and 4 and the $f_0$ components represented by the dashed line generated at levels 2 and 3 of the mid level are in opposite phases with different intensity levels. In this case, depending on a degree of deviation, the $f_0$ component may not be detected, or even if it is detected, the intensity level is too low and may not be used for control operations.

For this reason, the conventional bias control technique may not be applicable to a higher order multilevel modulation scheme, such as 16-QAM or 64-QAM because stable transmission signal characteristics cannot be obtained.

Therefore, it is desired to provide an optical transmitter, an optical modulation control method and an optical transmission system, which are able to efficiently perform bias control on a light modulation part of an optical transmitter to provide stable transmission signal characteristics.

In the following description, the preferred embodiments of the present invention are set forth with reference to the drawings. In the embodiments, an optical transmitter with a multilevel optical modulation (e.g., 16-QAM modulation) part controls bias voltages supplied to an I-arm and a Q-arm of an I/Q modulator and a bias voltage supplied to a phase shifter independently from each other, based upon a change in the power value of an alternating current (AC) component of an output of the multilevel optical modulation part. The technical concept of independent control on the bias voltages for the I/Q modulator and the bias voltage for the phase shifter is based upon a new perception that a variation (or a change) in the modulated output signal corresponding to the bias deviation in the I/Q modulator and a variation in the modulated output signal corresponding to the bias deviation in the phase shifter exhibit different characteristics.

The structures and methods of the embodiments are applicable to an arbitrary optical transmitter as long as it employs a phase modulation scheme using a modulation driving signal with 2*n intensity levels (where n is an integer equal to or greater than 1). When n=1, it is applied to Quadrature phase-shift keying (QPSK) using binary electrical waveforms (i.e., drive signals); when n=2, it is applied to 16-QAM using four-level electrical waveforms; and when n=4, it is applied to 64-QAM using 8-level electrical waveforms. The principles of the present invention is also applicable to higher order multilevel modulation schemes such as 256-QAM.

Bias deviations in I/Q modulator and that in the phase shifter can be detected and controlled independently from each other. A bias deviation of an I-arm and a bias deviation of a Q-arm of the I/Q modulator can also be detected and controlled independently from each other. Accordingly, by controlling at least one of the I-arm bias, the Q-arm bias, and the phase shifter bias, the bias voltage levels can be maintained at the optimum level, while preventing drift of the operating point and phase-shift deviation.

The embodiments are described in more detail below based upon actual examples. Although the examples are mainly illustrated in controlling all of the three bias voltages, the I-arm bias, the Q-arm bias and the π/2 phase shifter bias, the invention is not limited to these examples. Similarly, although an LN modulator is used as an example of an optical modulator, the invention is not limited to this example and is applicable to any types of Mach-Zehnder optical modulators such as a semiconductor Mach-Zehnder modulator.

a. First Embodiment

Figure 4:
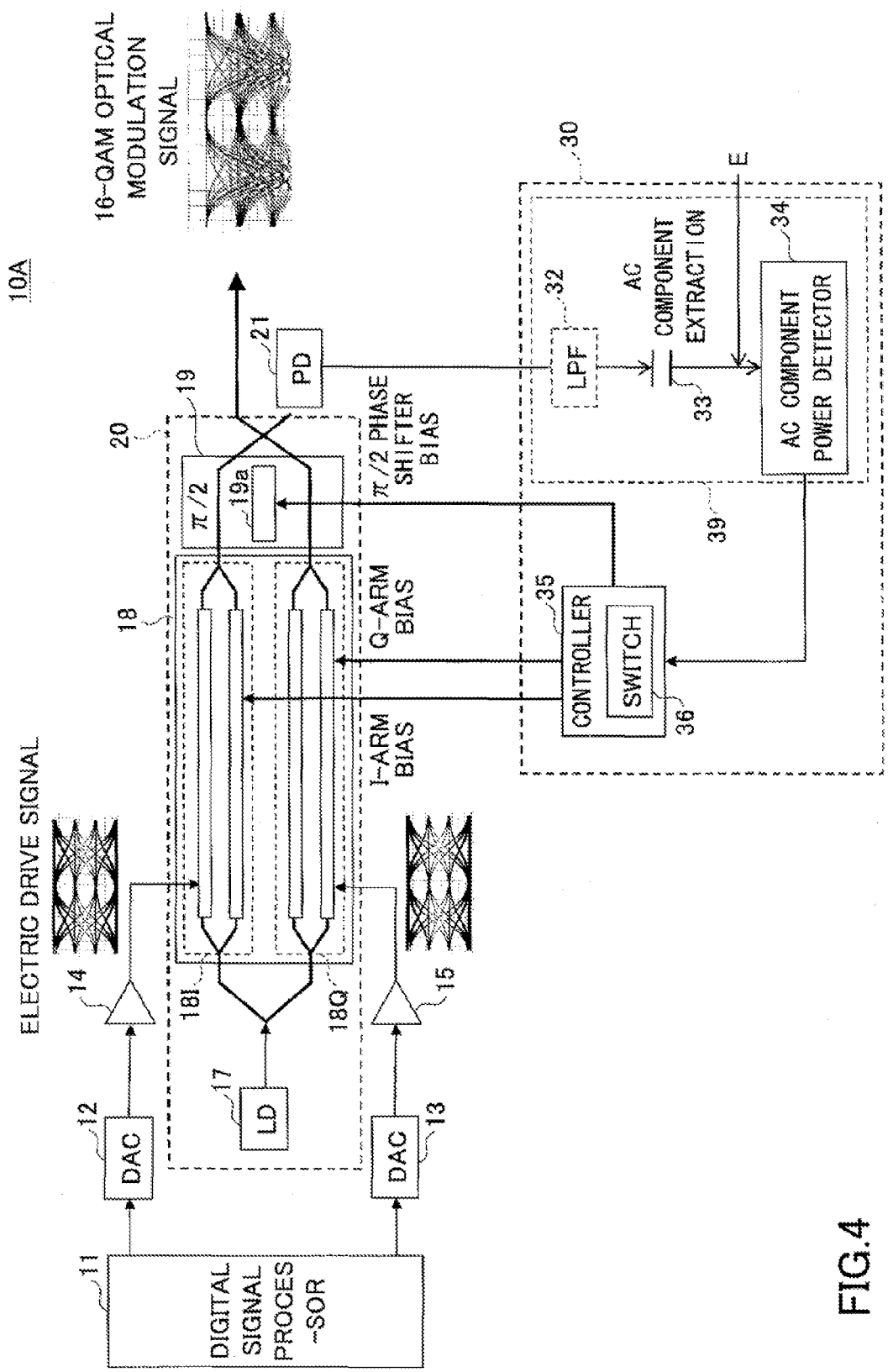
FIG. 4 illustrates a configuration example of an optical transmitter of the first embodiment.

FIG. 4 is a schematic diagram of an optical transmitter 10A according to the first embodiment. In the first embodiment, bias voltages for the I/Q arms and a bias voltage for the π/2 phase shifter are controlled based upon a change in the power value of an AC component in a monitoring output of an optical modulation part 20.

An optical transmitter 10A includes an optical modulation part 20, a photodetector (PD: photodiode) 21 which detects a portion of an output signal of the optical modulation part 20 and converts it into an electrical signal, a monitor 39, and a controller 35. The monitor 39 extracts an alternating current component (referred to simply as an AC component) from the detected modulation signal and monitors the power value of the AC component. The controller 35 controls bias voltages being supplied to the optical modulation part 20 based upon a change in the power value of the extracted AC component. The monitor 39 and the controller 35 form a bias control part 30. The monitor 39 and the controller 35 may be structured as separate circuits, separate FPGAs (Field-Programmable Gate Arrays) or separate processors; or alternatively they may be structured as a single circuit, a single FPGA, or a single processor. A low pass filter (LPF) 32 may be inserted between the photodetector (PD) 21 and the AC component extractor 33 to limit bandwidth of the electrical signal.

The optical modulation part 20 includes a light source 17, an I/Q modulator 18 and a π/2 phase shifter 19. The I/Q modulator 18 has an I-arm (the first waveguide) 18I and a Q-arm (the second waveguide) 18Q. The π/2 phase shifter 19 gives a π/2 phase difference between an optical signal output from the I-arm 18I and an optical signal output from the Q-arm 18Q. The π/2 phase shifter 19 is, for example, monolithically formed, together with the I/Q modulator 18, on a LiNbO3 crystal substrate, and has a bias application electrode 19a. The π/2 phase shifter 19 causes a phase difference between the two optical signal by, for example, using waveguides with different physical lengths or adjusting the optical length of the waveguides making use of a temperature difference.

The optical transmitter 10A also includes a digital signal processor 11, digital-analog converters (DAC) 12 and 13, and electrical amplifiers 14 and 15. The digital signal processor 11 generates two code sequences. The code sequences are modulated into analog drive signals having four electrical waveforms by the DAC 12 and 13, respectively. The amplitudes of the analog drive signals are adjusted by electrical amplifiers 14 and 15, and input to the I-arm 18I and the Q-arm 18Q, respectively, of the I/Q modulator. The analog drive signals (with amplitude Vπ) supplied to the I-arm 18I and the Q-arm 18Q are complementary drive signals with opposite signs, and the driving amplitude becomes 2×Vπ.

A light beam emitted from the light source (LD) 17 is separated and input to each of the I-arm 18I and the Q-arm 18Q. The light beams are modulated at the I-arm 18I and Q-arm 18Q by the four-level analog drive signals at a driving amplitude 2×Vπ. The optical signals output from the I-arm 18I and the Q-arm 18Q are subjected to a π/2 phase difference at the π/2 phase shifter 19, and then combined and output from the optical modulation part 20. The optical output of the optical modulation part 20 is 16-QAM optical modulation signal with 4-level amplitudes and 4-level phases.

A portion of the optical modulation signal output from the optical modulation part 20 is converted into an electrical signal by the photodetector (PD) 21 and input to the bias control part 30. Combining of the two optical signals having π/2 phase difference and branching of a portion of the combined optical signal toward the PD 21 are carried out by an appropriate optical coupler (not illustrated).

The monitor 39 includes an AC component extractor 33 and an AC component power detector 34. The AC component extractor 33 extracts an AC component from the inputted electrical signal. The AC component extractor 33 is, for example, a coupling capacitor which blocks a direct current component and transmits only an AC component. The AC component power detector 34 detects a power value (a value of an integral) of the extracted AC component based upon an optical spectrum acquired by an optical spectrum analyzer (not illustrated). The detected AC component power value is supplied to the controller 35.

The controller 35 controls bias voltages being supplied to the I-arm 18I, the Q-arm 18Q and the π/2 phase shifter 19 based upon the detected power value output from the AC component power detector 34. The controller 35 includes a switch 36 which switches between bias-control operations for the I-arm 18I, the Q-arm 18Q and the π/2 phase shifter 19. Specifically, in this embodiment, the controller 35 independently controls:
(a) bias voltages being supplied to the I-arm 18I and the Q-arm 18Q such that the AC component power value in the output of the PD 21 increases (to the maximum); and
(b) a bias voltage being supplied to the π/2 phase shifter 19 such that the AC component power value in the output of the PD 21 decreases (to the minimum).

Figure 5:
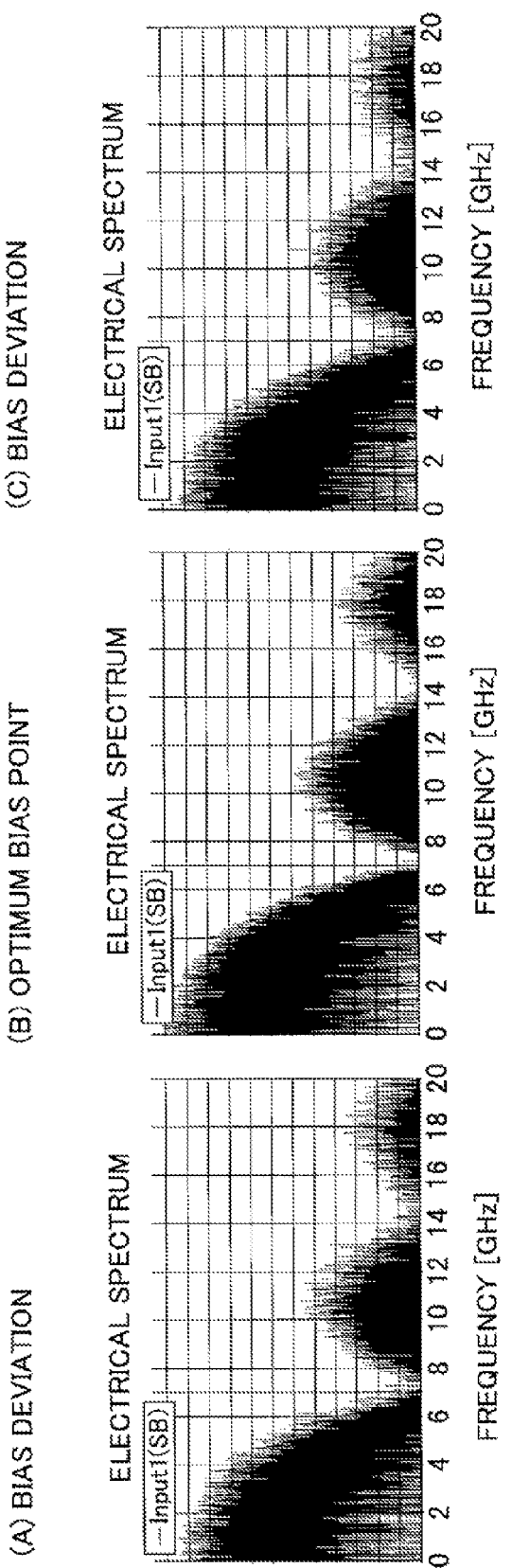
FIG. 5 illustrates a change in the electric spectrum of a monitor signal for bias deviation at I-arm (or Q-arm) of an I/Q modulator.
Figure 6:
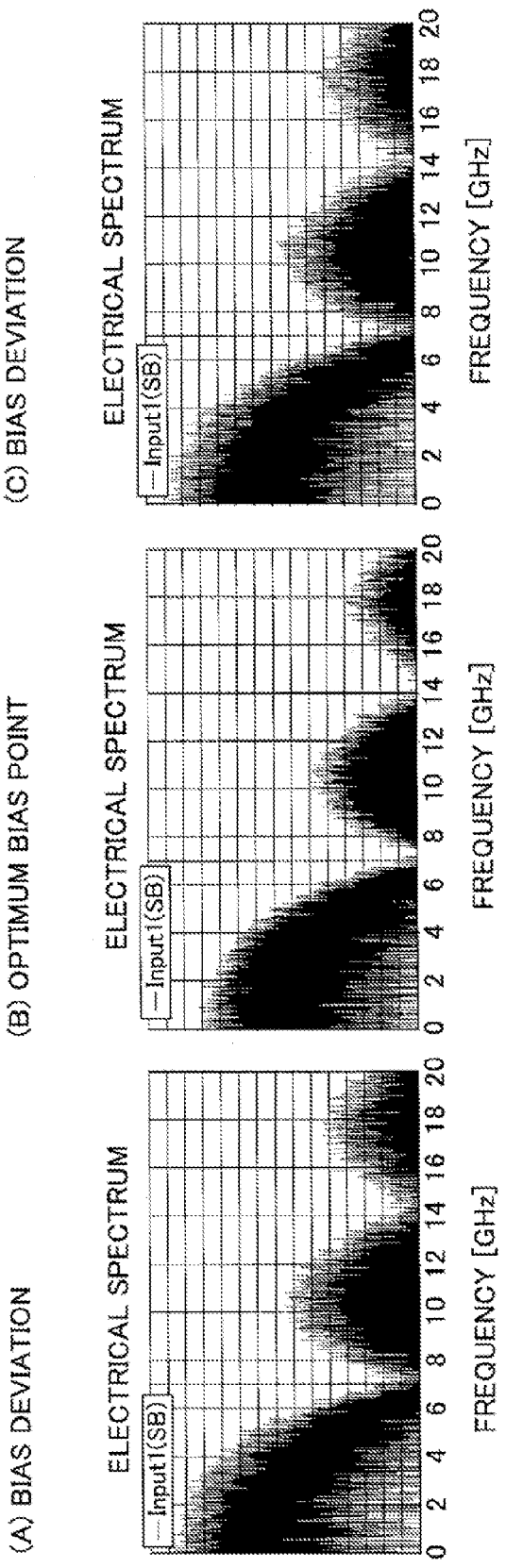
FIG. 6 illustrates a change in the electric spectra of a monitor signal for bias deviation at the π/2 phase shifter.

The principle of the independent control on the bias voltages is explained referring to FIG. 5 and FIG. 6.

FIG. 5 illustrates simulations of a change in electrical spectra of the monitor signal with respect to the bias deviation in the I-arm 18I or the Q-arm 18Q. The monitor signal represents a signal spectrum obtained by monitoring the output (indicated by the arrow E) of the AC component extractor 33 in FIG. 4.

In the case of the I-arm 18I and the Q-arm 18Q, the AC component power value in the monitor signal becomes maximum at the optimum bias point where the a bias voltage is set to the trough of the drive voltage/light intensity characteristics (see FIG. 2B) of the I/Q modulator 18, as illustrated in part (B) of FIG. 5. When the bias voltage deviates from the optimum point as illustrated in part (A) of FIG. 5 and part (C) of FIG. 5, the AC component power spectrum changes such that the AC component power value of the monitor signal decreases as a whole. Accordingly, making use of this change in the AC component power value, the bias voltages for the I-arm 18I and the Q-arm 18Q are controlled independently so as to maximize the AC component power value.

FIG. 6 illustrates simulations of a change in the electrical spectra of the monitor signal with respect to the π/2 phase shifter 19. The monitor signal represents a signal spectrum obtained by monitoring the output (indicated by the arrow E) of the AC component extractor 33 in FIG. 4. In the case of the π/2 phase shifter 19, the AC component power value in the monitor signal becomes the minimum at the optimum bias point of part (B) of FIG. 6, in a manner opposite to FIG. 5. When the bias voltage deviates from the optimum point as illustrated in part (A) and part (C) of FIG. 6, the AC component power spectrum changes such that the AC component power value of the monitor signal increases as a whole. Accordingly, making use of this change in the AC component power value, the bias voltage for the π/2 phase shifter 19 is controlled so as to minimize the AC component power value.

With this arrangement, the amplitude of the AC component in the output from the PD 21 is monitored directly, and the monitoring result can be fed back to the bias voltages of the I-arm 18I, the Q-arm 18Q and the π/2 phase shifter 19. In the first embodiment, additional components or processes for generating and superimposing a low-frequency signal on the optical signal, or superimposing a separate detection wave on a carrier wave are unnecessary. Therefore, the control process is direct and simple, and the device configuration is simplified.

Figure 7:
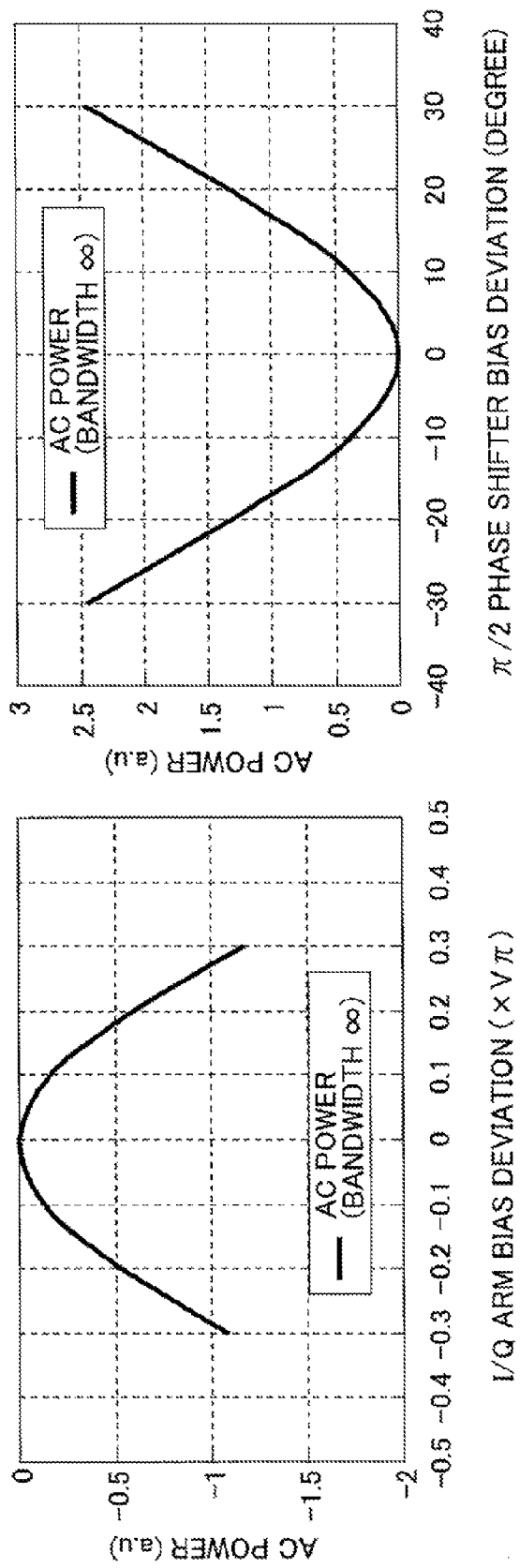
FIG. 7 illustrates diagrams representing changes in the power values of the AC component of a monitor signal with respect to bias deviation at the I/Q modulator and the π/2 phase shifter, respectively.

FIG. 7 illustrates graphs representing the relationship between bias deviation and AC component power change acquired by monitoring the AC component of the full output of the PD 21. Part (A) of FIG. 7 represents AC component power change as a function of bias deviation [×Vπ] of the I-arm 18I or the Q-arm 18Q. Part (B) of FIG. 7 represents AC component power change as a function of bias deviation [degrees] of the π/2 phase shifter 19. In part (A) of FIG. 7, at the zero bias deviation, the AC power becomes the maximum. In contrast, in part (B) of FIG. 7, at the zero bias deviation (i.e. with the phase difference of π/2), the AC power becomes the minimum. Making use of a change in the power value of the AC components, bias voltages for the I/Q modulator 18 and the π/2 phase shifter 19 are feedback-controlled.

Figure 8:
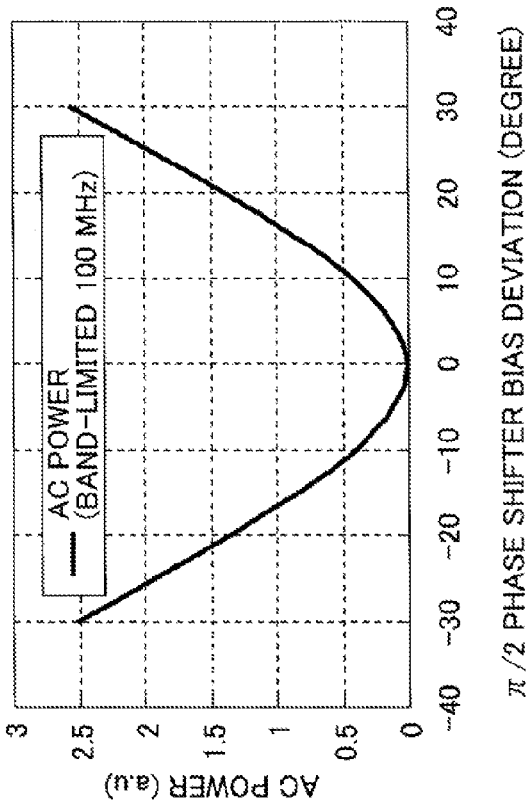
FIG. 8 illustrates diagrams representing a change in the power values of the AC components of band-limited monitor signals with respect to bias deviation at the I/Q modulator and the π2 phase shifter, respectively.
Figure 8:
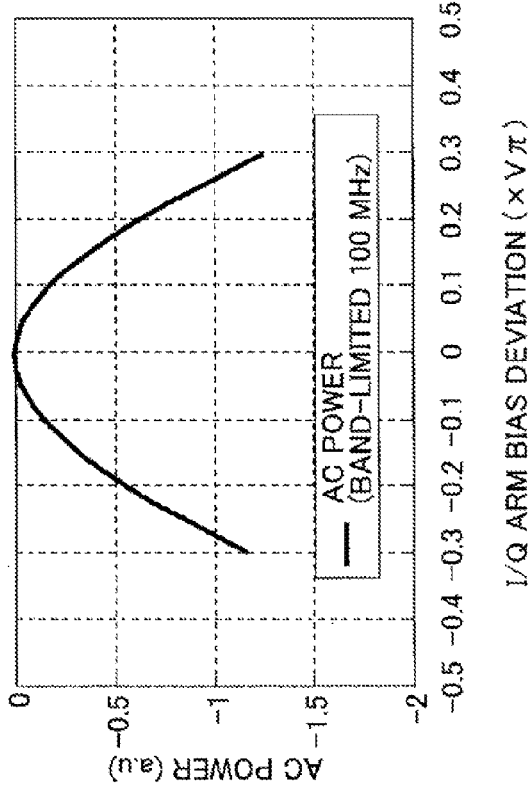

FIG. 8 illustrates simulations of a change in the AC component power with respect to bias deviation when a low-pass filter (LPF) 32 with a cutoff frequency of 100 MHz is inserted between the PD 21 and the AC component extractor 33. Change in the AC component power value can be detected at the same sensitivity as that in FIG. 7 even if band limitation is carried out by the LPF 32. This arrangement can regulates the bandwidth of the circuit, and accordingly, the device can be put into practical use using general-purpose components, contributing to downsizing and cost reduction.

Figure 9A:
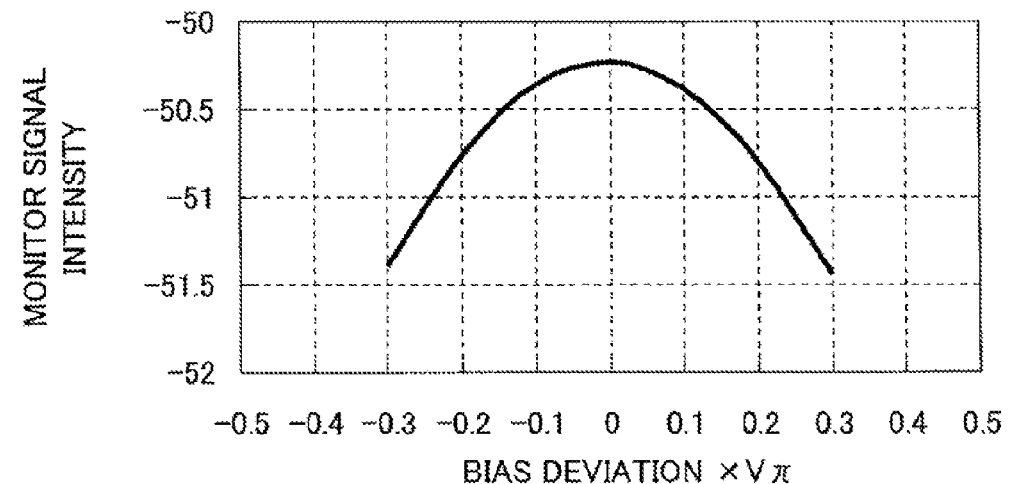
FIG. 9A illustrates an I/Q arm bias shift, a drive signal waveform and an optical modulation signal waveform when the basic idea of the first embodiment is applied to QPSK modulation.
Figure 9A:
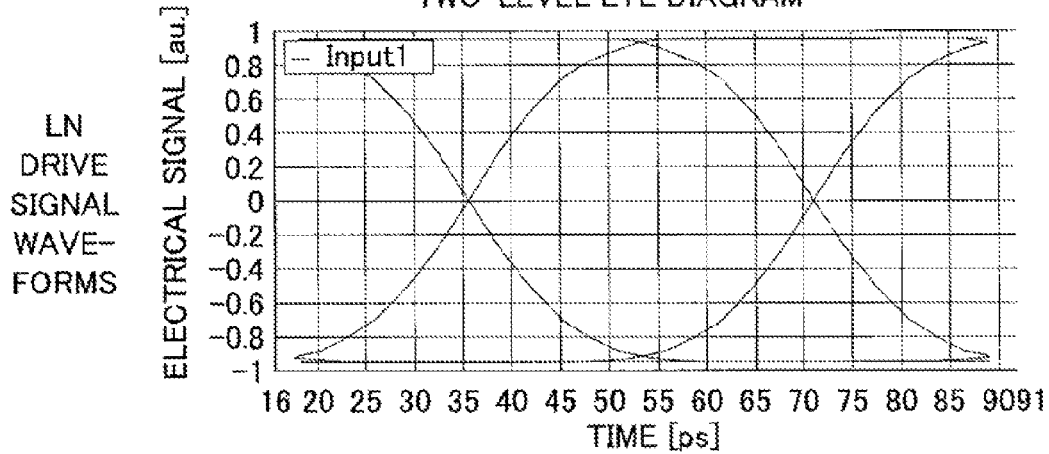
Figure 9A:
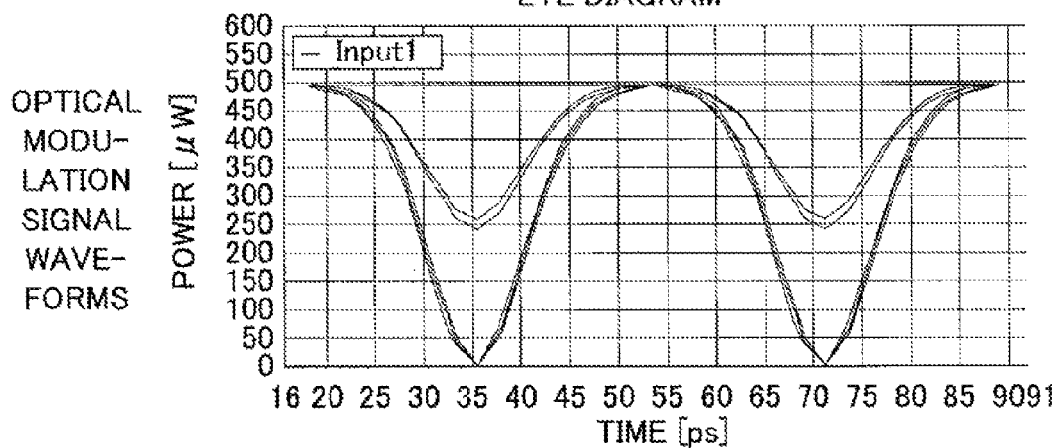
Figure 9B:
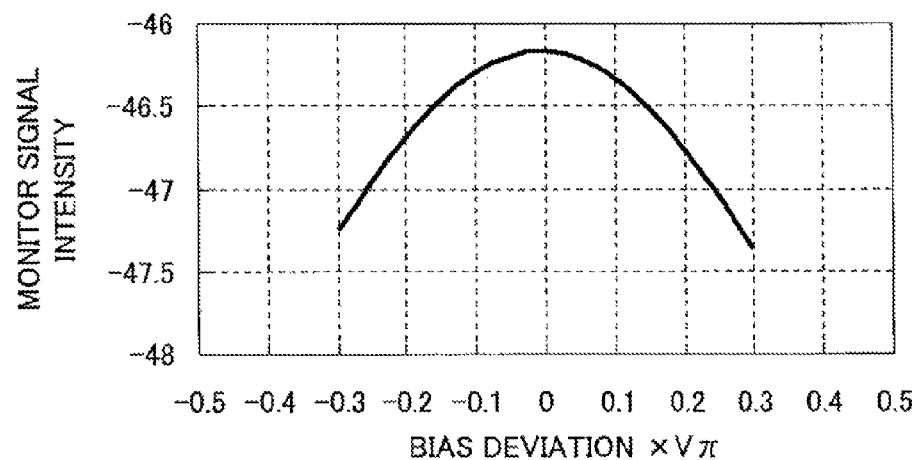
FIG. 9B illustrates an I/Q arm bias shift, a drive signal waveform and an optical modulation signal waveform when the basic idea of the first embodiment is applied to 16-QAM.
Figure 9B:
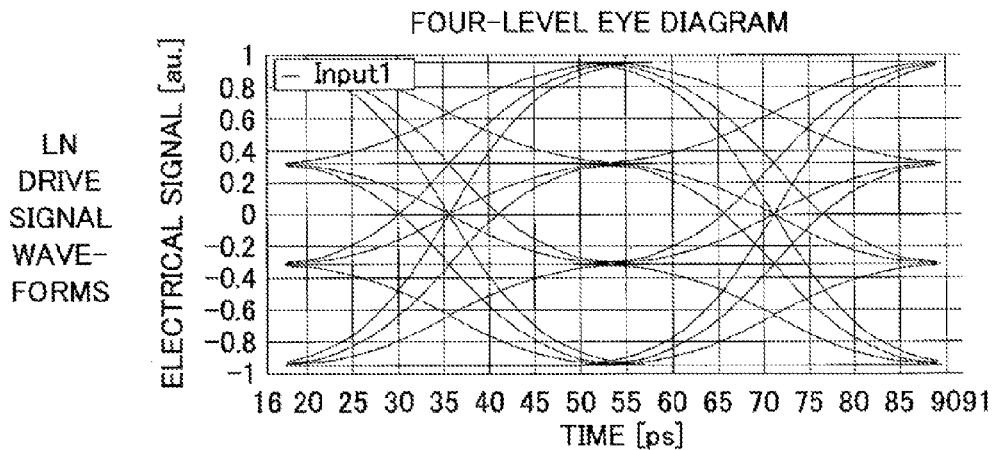
Figure 9B:
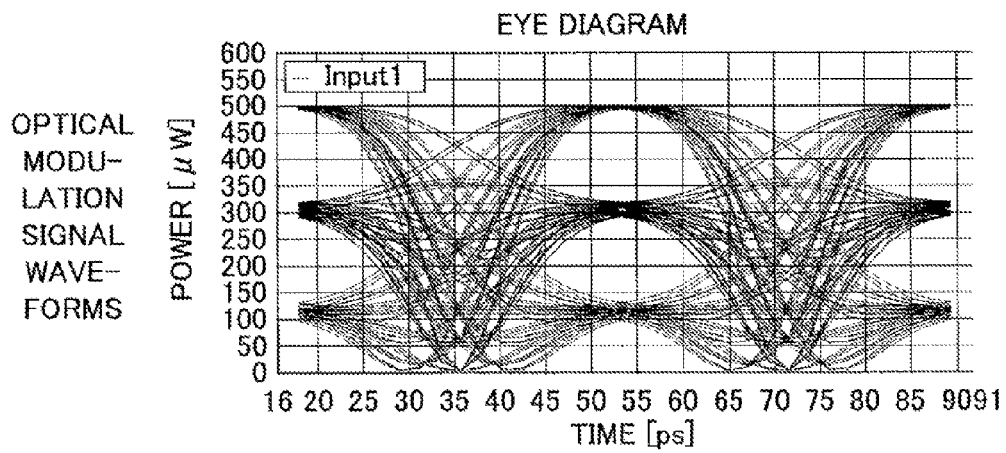
Figure 9C:
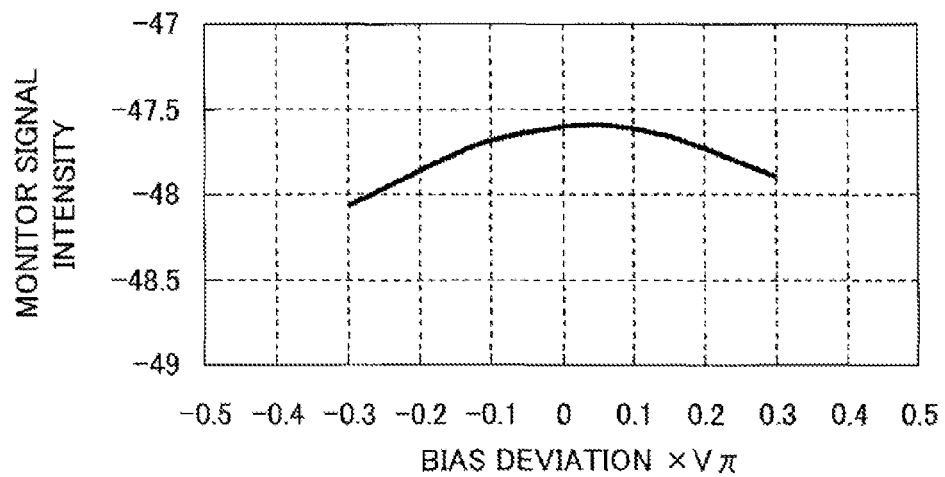
FIG. 9C illustrates an I/Q arm bias shift, a drive signal waveform and an optical modulation signal waveform when the basic idea of the first embodiment is applied to 64-QAM.
Figure 9C:
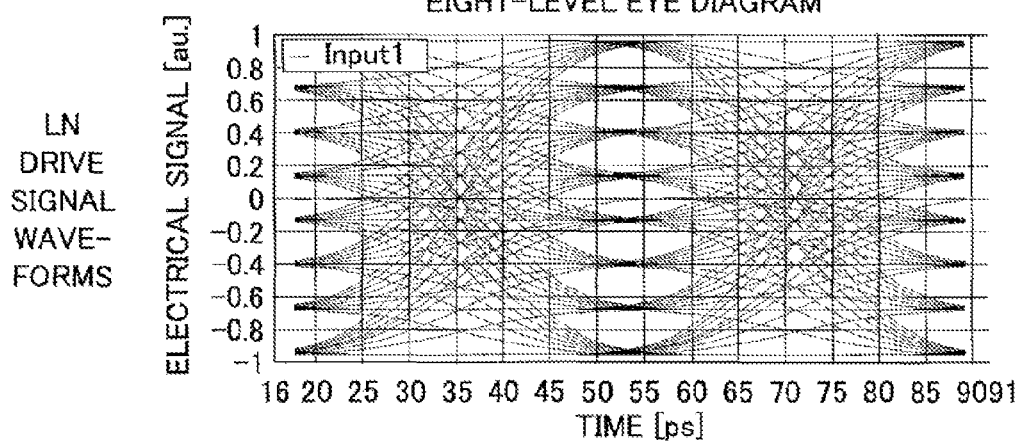
Figure 9C:
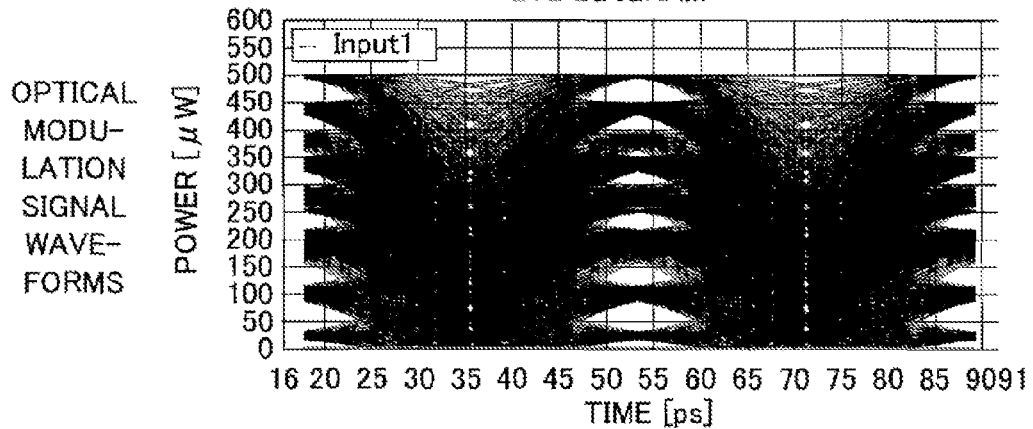

FIG. 9A through FIG. 9C illustrates extended applications of the first embodiment to QPSK, 16-QAM and 64-QAM. FIG. 9A represents characteristics of the QPSK modulation scheme, FIG. 9B represents characteristics of the 16-QAM modulation scheme and FIG. 9C represents characteristics of the 64-QAM modulation scheme. Each of the figures illustrates an AC component power change with respect to bias deviation in the I-arm (or the Q-arm), together with corresponding LN drive signal waveforms and optical modulation signal waveforms.

It is understood from FIG. 9A to FIG. 9C that in a modulation scheme using a drive signal with waveforms of 2*n intensity levels (n is an integer equal to or greater than 1), the intensity of the AC monitor component becomes the maximum as in the 16-QAM format. This means that the structure and the process of the first embodiment are applicable to a multi-level modulation format modulated at intensity levels of 2*n (n is an integer equal to or greater than 1), other than 16-QAM. In the applications, the configurations of the optical modulation part 20 and a bias control part 30 illustrated in FIG. 4 are unchanged, and only waveforms of the drive signal supplied to the I/Q modulator (the LN modulator) 18 are changed.

Figure 10:
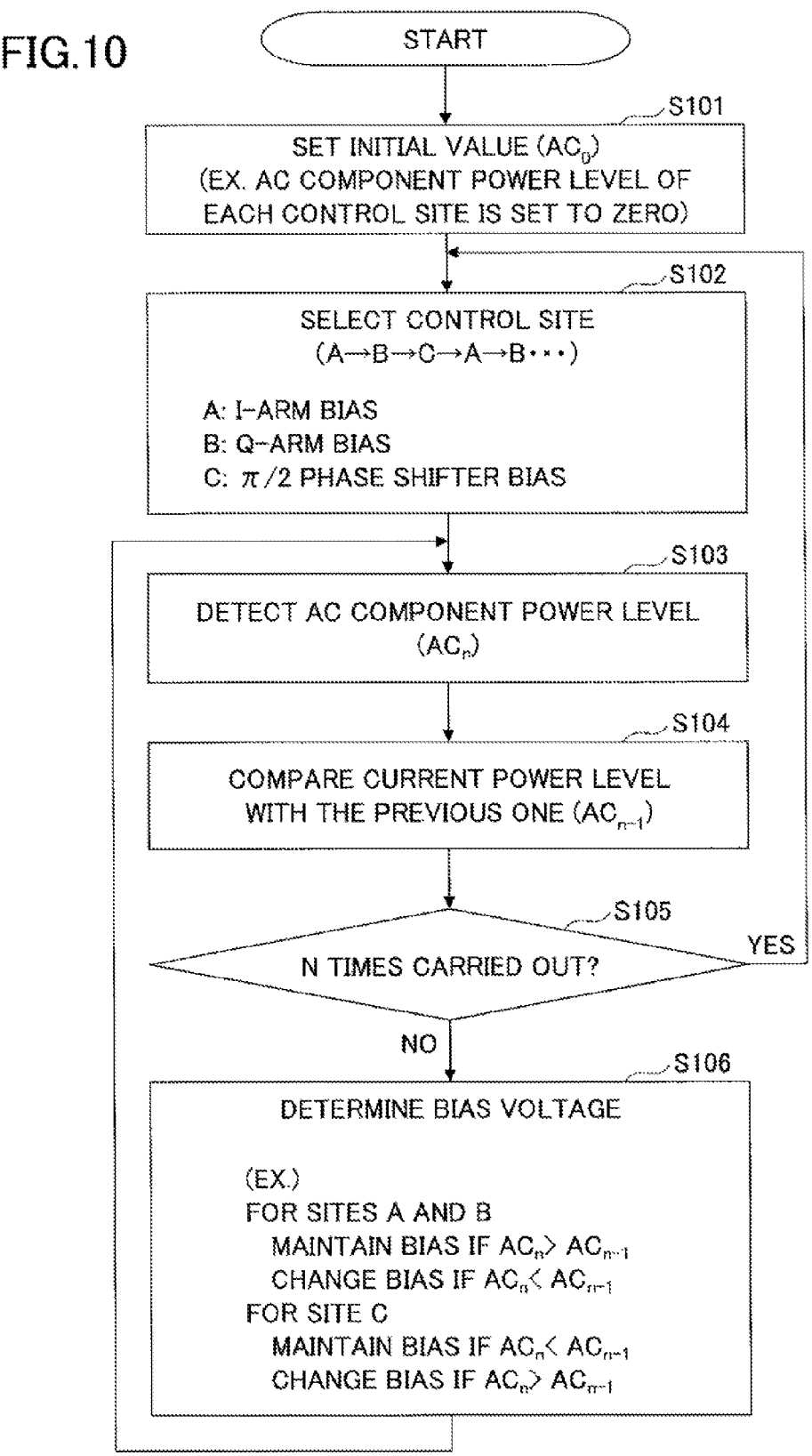
FIG. 10 is a flowchart illustrating a process flow of bias control according to the first embodiment.

FIG. 10 illustrates a control flow of the first embodiment. The controller 35 successively switches between controls on the I-arm bias, the Q-arm bias and the π/2 phase shifter bias in a time-shared manner by means of the switch 36. For the sake of convenience, the process for the I-arm bias is called a process A, a process for the Q-arm bias is called a process B, and a process for the π/2 phase shifter bias is called a process C.

When the process starts, the AC component power value is set to an initial value $AC_0$ (S101). The initial value $AC_0$ is set to, for example, zero. Then, a control site is selected from A, B and C (S102). Since monitoring and bias determination of the respective control sites (the I-arm bias, the Q-arm bias and π/2 phase shifter bias) are performed independently, the control target (site) can be suitably selected according to the operating state of the optical transmitter 10A. For example,
(i) only the I-arm bias or the Q-arm bias is controlled;
(ii) both the I-arm bias and the Q-arm bias are controlled;
(iii) only the π/2 phase shifter bias is controlled; or
(iv) all of the I-arm bias, the Q-arm bias and the π/2 phase shifter bias are controlled.

In this example, all of the I-arm bias, the Q-arm bias and the π/2 phase shifter bias are controlled successive as in item (iv).

First, the controller 35 selects the I-arm bias site (process A) as the control target (S102). The bias voltage supply line is switched to the I-arm. The AC power detector 34 of the monitor 39 detects the AC component power value $AC_n$ in the output signal from the PD 21, and supplies the detected value to the controller 35 (S103). The controller 35 stores the latest AC component power value of the I-arm as a previous power value $AC_{n-1}$, and compares the currently monitored power value $AC_n$ to the previous power value $AC_{n-1}$ (S104). The controller 35 repeats the comparison of the AC power values N times (NO in S105), and sets a bias voltage based upon the comparative result (S106).

Focusing on the control process for the I-arm bias, if the currently monitored AC component power value is greater than the previously monitored power value ($AC_n > AC_{n-1}$), it means that the bias voltage is changed in a direction so that the power of the AC component is approaching the maximum, namely, the optimum point (see FIG. 7 part (A) and FIG. 8 part (A)). In this case, the controller 35 maintains the current bias voltage level. If the currently monitored AC component power value is smaller than the previously monitored power value ($AC_n < AC_{n-1}$), it means that the bias voltage is away from the optimum point. Accordingly, the controller 35 shifts the bias voltage toward a positive direction or a negative direction.

If in the past process the bias voltage has been controlled in a direction so that the value of the bias deviation decreases, bias control has been performed on the positive side of FIG. 7 part (A) and FIG. 8 part (A). In this case, the bias voltage is shifted to the negative direction. If in the past process the bias voltage has been controlled in a direction that the bias deviation value increases, bias control has been performed on the negative side of FIG. 7 part (A) and FIG. 8 part (A). In this case, the bias voltage is shifted to the positive direction. The step size of changing the bias voltage may be fixed to a predetermined value in advance, or alternatively, it may be adjusted adaptively during the process. The step sizes of the bias adjustment for the I-arm 18I and the Q-arm 18Q and the step size of the bias adjustment for the π/2 phase shifter 19 may be set differently.

When the bias voltage is determined, the controller 35 stores the AC component power value, increments n, and returns to step S103. The controller 35 again receives the current AC component power value $AC_n$ (n=n+1) from the AC component power detector 34 (S103), compares the current power value with the stored previous power value $AC_{n-1}$ (S104), and determines a bias voltage until n reaches N (S105, S106). When the process has been repeated N times (YES at step S105), the control on I-arm bias is terminated and the process returns to step S102.

In step S102, the controller 35 switches the control site to the Q-arm bias (process B), whereby the bias control process is performed for the Q-arm. The initial bias voltage value set in the Q-arm is one that determined last in the previous control. For the Q-arm, steps S103 through S106 are repeated N-times as in the control on the I-arm, and the Q-arm bias is set to the optimal level.

Then, the controller 35 switches the control site to the π/2 phase shifter bias (process C). In the case of the π/2 phase shifter bias, steps from S103 through S105 are the same as those for the I-arm bias and the Q-arm bias, but the bias determination step S106 is opposite to that for the I-arm bias (process A) and the Q-arm bias (process B).

If the currently monitored AC component power value is smaller than the previous power value ($AC_n < AC_{n-1}$), it means that the bias voltage has been shifted in a direction so that the AC component power value approaches the minimum value (see FIG. 7 part (B) and FIG. 8 part (B)). In this case, the controller 35 maintains the current bias voltage. If the currently monitored AC component power value is greater than the previously monitored power value ($AC_n < AC_{n-1}$), it means that the bias voltage is away from the optimum point (at which the phase shift amount becomes π/2). In this case, the bias voltage is shifted to the positive direction or the negative direction. If in the past process the bias voltage has been changed in a direction where the bias deviation value decreases, adjustment of the bias deviation has been performed on the positive side in FIG. 7 part (B) and FIG. 8 part (B). In this case, the bias voltage is shifted to the negative side. If in the past process the bias voltage has been changed in a direction where the bias deviation value increases, adjustment of the bias deviation has been performed on the negative side in FIG. 7 part (B) and FIG. 8 part (B). In this case, the bias voltage is shifted to the positive direction.

When the process C for the π/2 phase shifter bias has been repeated N times (YES in step S105), the controller 35 switches the control site to process A again (S102).

In this manner, the I-arm bias, the Q-arm bias and the π/2 phase shifter bias are sequentially controlled based upon the change in the AC component power value in the modulated signal.

Although not illustrated in FIG. 4, the controller 35 has a memory to store the previous AC power value and the determined bias voltage and a counter for incrementing n in the processes A, B and C. Since such components are conventional ones, explanation for these components is omitted.

b. Second Embodiment

Figure 11:
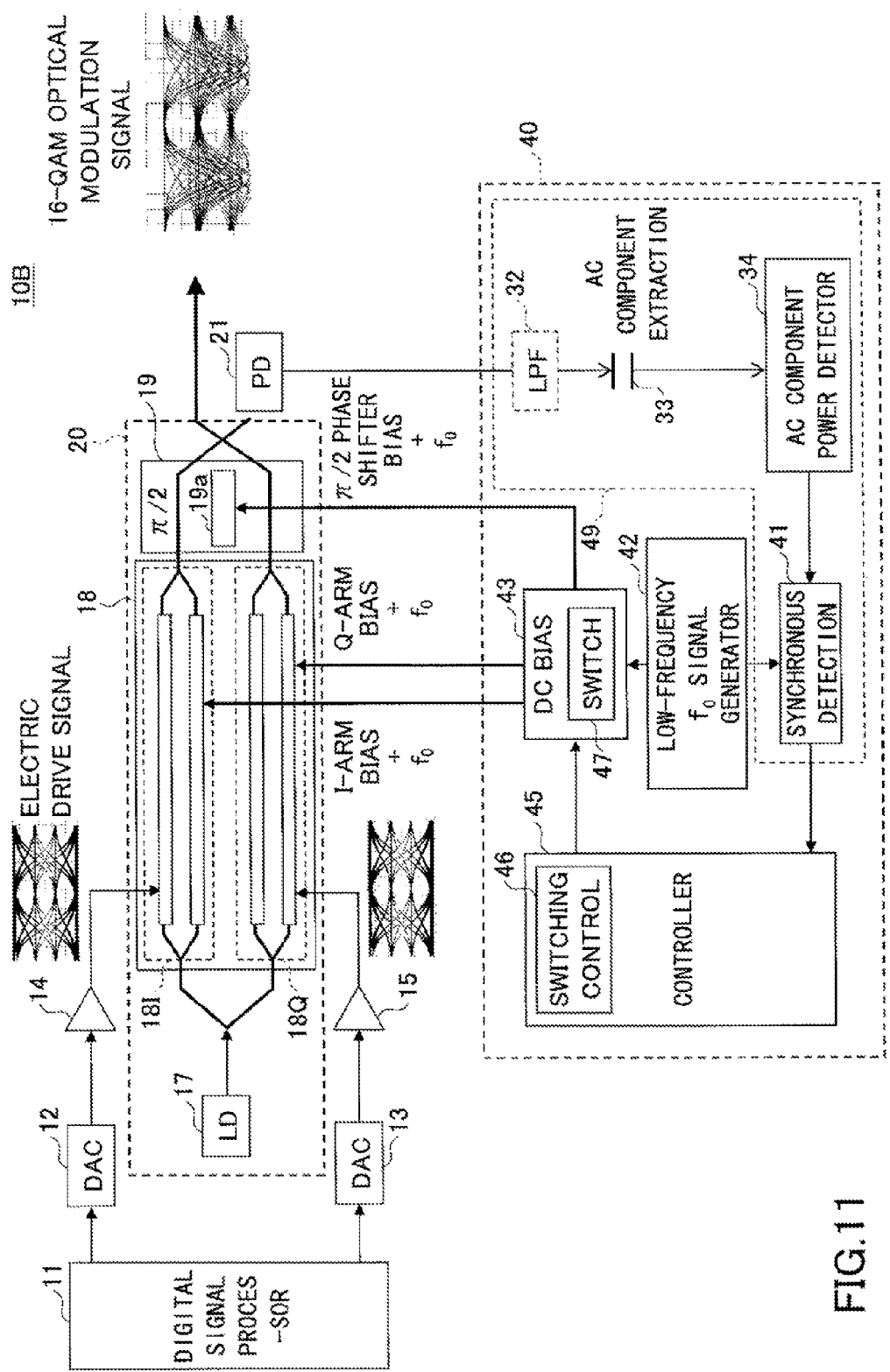
FIG. 11 illustrates a configuration example of an optical transmitter of the second embodiment.

FIG. 11 illustrates an optical transmitter 10B according to the second embodiment. In the second embodiment, a low-frequency signal $f_0$ is superimposed on a bias voltage to be supplied to the optical modulation part 20. The bias voltage is controlled to the optimum point based upon a change in the low-frequency signal $f_0$ contained in the detected AC component. The structures of the optical modulation part 20, the photodetector (PD) 21, the digital signal processor 11, the DAC 12 and 13, and the electrical amplifiers 14 and 15 of the optical transmitter 10B are the same as those in the first embodiment.

A bias controller 40 of the optical transmitter 10B includes an AC component extractor 33, an AC component power detector 34, an optionally provided LPF 32, a synchronous detector 41, a low-frequency signal generator 42, a DC bias circuit 43 and a controller 45. A monitor 49 includes the LPF 32, the AC component extractor 33, the AC component power detector 34 and the synchronous detector 41. The monitor 49, the low-frequency signal generator 42, the DC bias circuit 43 and the controller 45 may be structured as separate circuits, separate FPGAs (Field-Programmable Gate Arrays) or separate processors; or alternatively, they may be formed as a single circuit, a single FPGA, or a single processor.

The low-frequency signal generator 42 generates a low-frequency signal $f_0$ which is lower than the frequency of the modulated wave (the symbol frequency) of the I/Q modulator 18, and supplies the low-frequency signal $f_0$ onto the DC bias circuit 43. The DC bias circuit 43 superimposes the low-frequency signal $f_0$ to a generated DC bias voltage. Consequently, the DC bias voltage changes at frequency $f_0$. The DC bias circuit 43 includes a switch 47 to sequentially switch between supply of the bias voltage in which the low-frequency signal $f_0$ is superimposed onto the I-arm 18I, the Q-arm 18Q and π/2 phase shifter 19, based upon an instruction from a switching controller 46 of the controller 45. That is, the bias voltage containing the superimposed low-frequency signal $f_0$ is supplied to a currently controlled target site.

The PD 21 receives a portion of the modulated light output from the optical modulation part 20 and converts the light into an electrical signal. The electrical signal is supplied to the AC component extractor 33 of the bias controller 40. The operations and the functions of the AC component extractor 33 and the AC component power detector 34 are the same as those in the first embodiment. A difference is that the superimposed low-frequency signal component $f_0$ is contained in the AC component, which is extracted at the AC component extractor 33 and whose power value is detected at the AC component power detector 34.

The output of the AC component power detector 34 is supplied to the synchronous detector 41. The synchronous detector 41 extracts the low-frequency component $f_0$ contained in the AC component by synchronous detection, using the low-frequency signal $f_0$ generated at the low-frequency signal generator 42. The extracted low-frequency signal $f_0$ is supplied as a monitor signal to the controller 45. The controller 45 controls a DC bias generated by the DC bias circuit 43 such that the monitor signal $f_0$ becomes substantially zero. This operation is explained with reference to FIG. 12.

Figure 12:
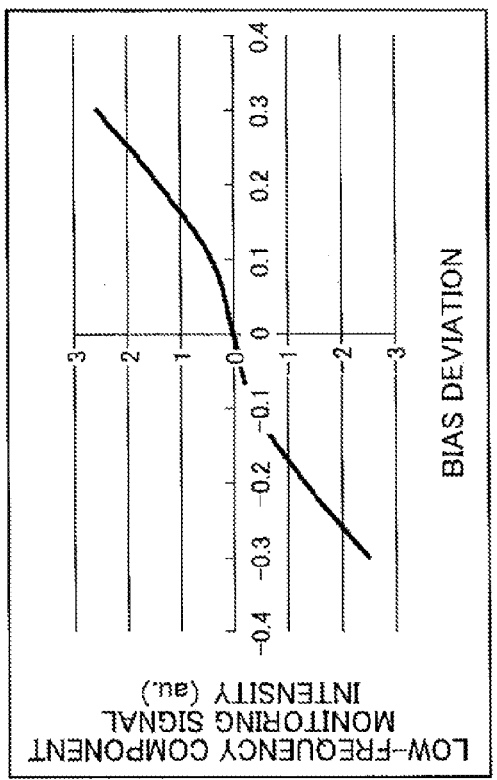
FIG. 12 illustrates diagrams representing a change in intensity of the low-frequency component of the monitor signals with respect to bias deviation at the I/Q modulator and the π/2 phase shifter, respectively.
Figure 12:
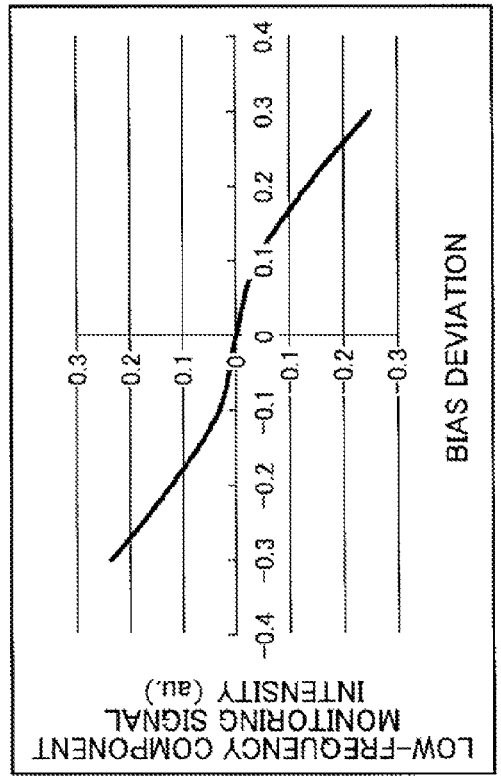

FIG. 12 illustrates the relationship between intensity of the monitor signal ($f_0$ signal extracted from the AC component) and bias deviation. FIG. 12 part (A) represents a characteristic of the I-arm bias or the Q-arm bias, and FIG. 12 part (B) represents a characteristic of $\pi/2$ phase shifter bias. The graph of FIG. 12 part (A) indicates a change from the maximum point of the AC component illustrated in FIG. 7 part (A) and FIG. 8 part (A) as a change of the low-frequency signal $f_0$. The graph of FIG. 12 part (B) indicates a change from the minimum point of the AC component illustrated in FIG. 7 part (B) and FIG. 8 part (B) as a change of the low-frequency signal $f_0$. The direction of the change of the I-arm bias and Q-arm bias is opposite to the direction of the change of the $\pi/2$ phase shifter bias.

The signal intensity on the vertical axis with a negative value means that a phase of the low-frequency signal component $f_0$ has inverted. For all of the I-arm bias, the Q-arm bias and the $\pi/2$ phase shifter bias, the monitor signal $f_0$ component becomes zero at the optimum point (at which the bias deviation of the vertical axis becomes zero). Besides, in the vicinity of the optimum point, the phase of the $f_0$ component inverts. Accordingly, the optimum point of the bias can be detected by controlling the bias voltage so as to bring the monitored low-frequency signal $f_0$ to or about zero, or finding a point at which the phase of the low-frequency signal $f_0$ inverts, or the combination of these.

With this method, the direction of change can be known by the sign (plus or minus) of the monitor signal ($f_0$). If, in the I-arm bias and the Q-arm bias, the value of the detected monitor signal $f_0$ is positive, the bias is set toward the positive direction. If the value of a detected monitor signal $f_0$ for the I-arm bias and the Q-arm bias is negative, then the bias is set toward the negative direction. For the $\pi/2$ phase shifter bias, the direction of change is opposite to that of the I-arm bias and the Q-arm bias. Therefore, the bias is set toward the negative direction if the detected monitor signal $f_0$ is positive, and the bias is set toward the positive direction if the detected monitor signal $f_0$ is negative.

The bias control for the I-arm bias and the Q-arm bias to bring the monitored $f_0$ signal closer to zero corresponds to the bias control to bring the AC component power value closer to the maximum in the first embodiment. The bias control for the $\pi/2$ phase shifter bias to bring the monitored $f_0$ signal closer to zero corresponds to the bias control to bring the AC component power value closer to the minimum in the first embodiment.

In the second embodiment, monitoring and controlling for the I-arm bias, the Q-arm bias and the $\pi/2$ phase shifter bias are carried out in a time-shared manner by a common bias controller 40. The controller 45 includes a switching controller 46 to control the switching operation of the switch 47 of the DC bias circuit 43.

Figure 13:
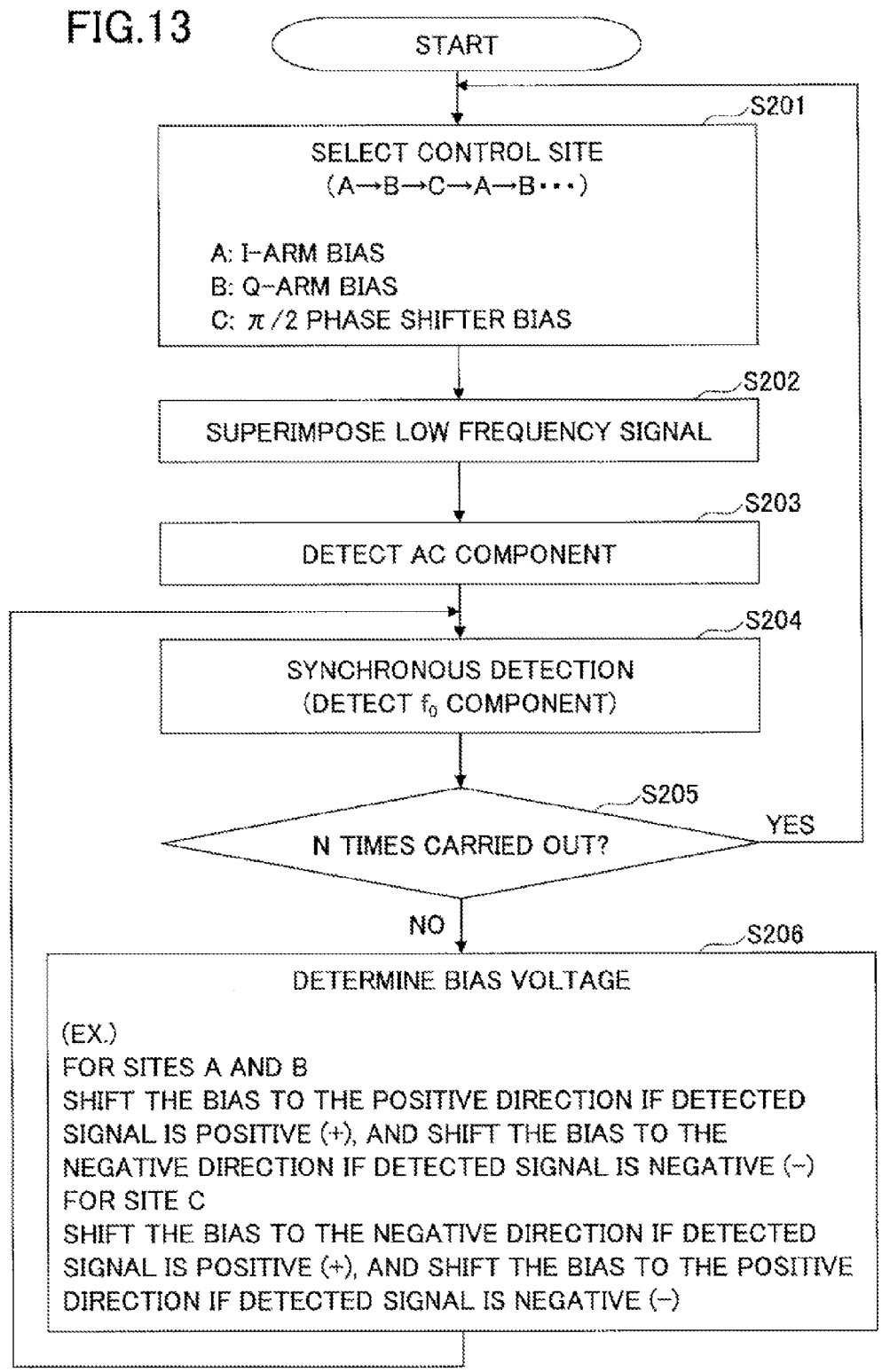
FIG. 13 is a flowchart illustrating a process flow of bias control according to the second embodiment.

FIG. 13 illustrates an example of control flow of the second embodiment. For the sake of convenience, the process for the I-arm bias is called a process A, a process for the Q-arm bias is called a process B, and a process for the $\pi/2$ phase shifter bias is called a process C.

When the process starts, the controller 45 selects the I-arm bias (process A) as the currently processed control site (S201). The switching controller 46 of the controller 45 causes the switch 47 of the DC bias circuit to supply a bias voltage to the I-arm. The low-frequency signal $f_0$ is generated at the low-frequency signal generator 42 and superimposed on the DC bias (S202). The bias with the low-frequency signal $f_0$ superimposed is supplied to the control target I-arm 18I. The AC component is detected from the output signal of the PD 21 by the AC power detector 34 (S203). A low-frequency signal $f_0$ is extracted as a monitor signal by synchronous detection (S204). The controller 45 sets and updates the bias voltage based upon the monitor signal (S206) until the number of detection counts has reached N (NO in S205).

As has been described above, if, for the I-arm bias, the sign of the detected monitor signal is positive, the bias is changed in the positive direction. If the sign of the detected monitor signal is negative, the bias is changed in the negative direction. The step size of changing the bias voltage may be set to an appropriate value in advance, or it may be variable, for example, being made smaller every time the detection is performed.

When the process has been repeated N times (YES in S205), the controller 45 switches the control process to the Q-arm bias (process B) (S201). The operations for the process B are the same as those for process A. When the process for the Q-arm bias has been repeated N times, the control process is switched to that for the $\pi/2$ phase shifter bias (process C) (S201). In the $\pi/2$ phase shifter bias, if the detected monitor signal $f_0$ has a positive value, the bias is changed in the negative direction. If the detected monitor signal $f_0$ has a negative value, the bias is changed to the positive direction (S206). The step size of changing the bias voltage may be set to an appropriated value in advance. The step size for adjusting the $\pi/2$ phase shifter bias may be different from that for the I-arm bias and the Q-arm bias.

When the process C for the $\pi/2$ phase shifter bias has been repeated N times (YES in S205), the controller 45 switches the control target to the process A (S201).

In this manner, the I-arm bias, the Q-arm bias and the $\pi/2$ phase shifter bias are sequentially controlled based upon the change in the low-frequency signal $f_0$ contained in the AC component of the modulated light.

In the second embodiment, sensitivity of control is improved by superimposing a low-frequency signal onto the DC bias. The synchronous detector 41 may be omitted in the second embodiment. In this case, in detecting the low-frequency signal component $f_0$ without performing synchronous detection, only the amplitude is detected without detecting the direction of change (plus or minus sign). Accordingly, the previously detected value is stored for comparison with the currently detected value to carry out bias control, as in the first embodiment.

With the arrangement of the second embodiment (when using synchronous detection), the direction of change can be known immediately from the sign of the monitor signal, and comparison between the current value and the previous value can be omitted. In addition, sensitivity of control is improved.

c. Third Embodiment

Figure 14:
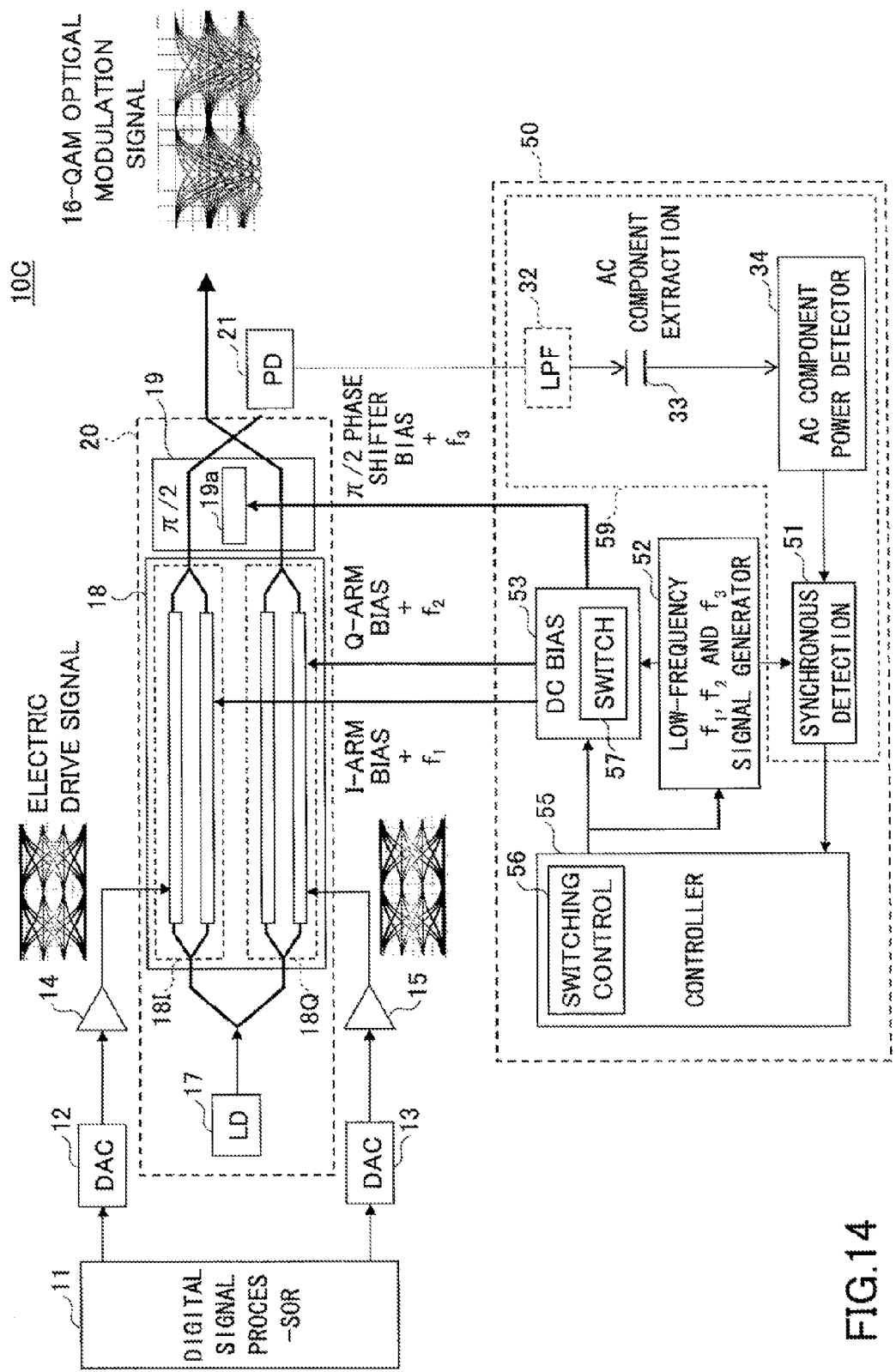
FIG. 14 illustrates a configuration example of an optical transmitter of the third embodiment.

FIG. 14 illustrates an optical transmitter 10C according to the third embodiment. In the third embodiment, bias control is carried out in a frequency dividing manner using multiple low-frequency signals. For example, a low-frequency signal of frequency $f_1$ is superimposed on the bias voltage for the I-arm bias, a low-frequency signal of frequency $f_2$ is superimposed on the bias voltage for the Q-arm bias, and a low-frequency signal of frequency $f_3$ is superimposed on the bias voltage for the π/2 phase shifter bias.

The structure of the optical transmitter 10C is basically the same as that of the second embodiment. A difference is that a low-frequency signal generator 52 of a bias controller 50 generates three different low-frequency signals, $f_1$, $f_2$, and $f_3$. In the third embodiment, bias controls for the I-arm bias, the Q-arm bias and the π/2 phase shifter bias are executed in a time-shared manner as in the first and second embodiments. The low-frequency signal generator 52 generates a low-frequency signal $f_1$ when the I-arm bias is controlled, generates a low-frequency signal $f_2$ when the Q-arm bias is controlled, and generates a low-frequency signal when the π/2 phase shifter bias is controlled, in accordance with instructions from a controller 55. The frequencies $f_1$, $f_2$, and $f_3$ of the low-frequency signals are lower than the symbol rate (modulation rate) of the I/Q modulator 18.

According to the instruction from a switching controller 56 of the controller 55, the DC bias circuit 53 superimposes a low-frequency signal $f_1$ supplied from a low-frequency signal generator 52 on a bias voltage when the I-arm bias is controlled. The DC bias circuit 53 also switches a switch 57 to the I-arm control site to supply the bias voltage on which the low-frequency signal $f_1$ is superimposed to the I-arm 18I. In the same manner, the DC bias circuit 53 superimposes a low-frequency signal $f_2$ supplied from the low-frequency signal generator 52 on a bias voltage when the Q-arm bias is controlled. The DC bias circuit 53 switches the switch 57 to the Q-arm control site to supply the bias voltage on which the low-frequency signal $f_2$ is superimposed to the Q-arm 18Q. When the π/2 phase shifter bias is controlled, the DC bias circuit 53 superimposes a low-frequency signal $f_3$ supplied from the low-frequency signal generator 52 on a bias voltage, and switches the switch 57 to the π/2 phase shifter control site to supply the bias voltage on which the low-frequency signal $f_3$ is superimposed to the π/2 phase shifter 19.

A monitor 59 receives an electrical signal from the PD 21, which signal is obtained through optical-to-electrical conversion from a portion of the 16-QAM optical modulation signal output from the optical modulation part 20. Operations of the AC component extractor 33 and the AC component power detector 34 are the same as those in the first and the second embodiments. Operations of the synchronous detector 51 are the same as those in the second embodiment. Monitor signals $f_1$ and $f_2$ detected by the synchronous detector 51 exhibit characteristics of direction of change similar to that of the monitor signal $f_0$ in FIG. 12 part (A). The monitor signal $f_3$ exhibits the characteristic of direction of change similar to that of the monitor signal $f_0$ in FIG. 12 part (B). The monitor 59, the low-frequency signal generator 52, the DC bias circuit 53 and the controller 55 may be structured as separate circuits, separate FPGAs (Field-Programmable Gate Arrays) or separate processors; or alternatively, they may be formed in a single circuit, a single FPGA (Field-Programmable Gate Array) or a single processor.

Figure 15:
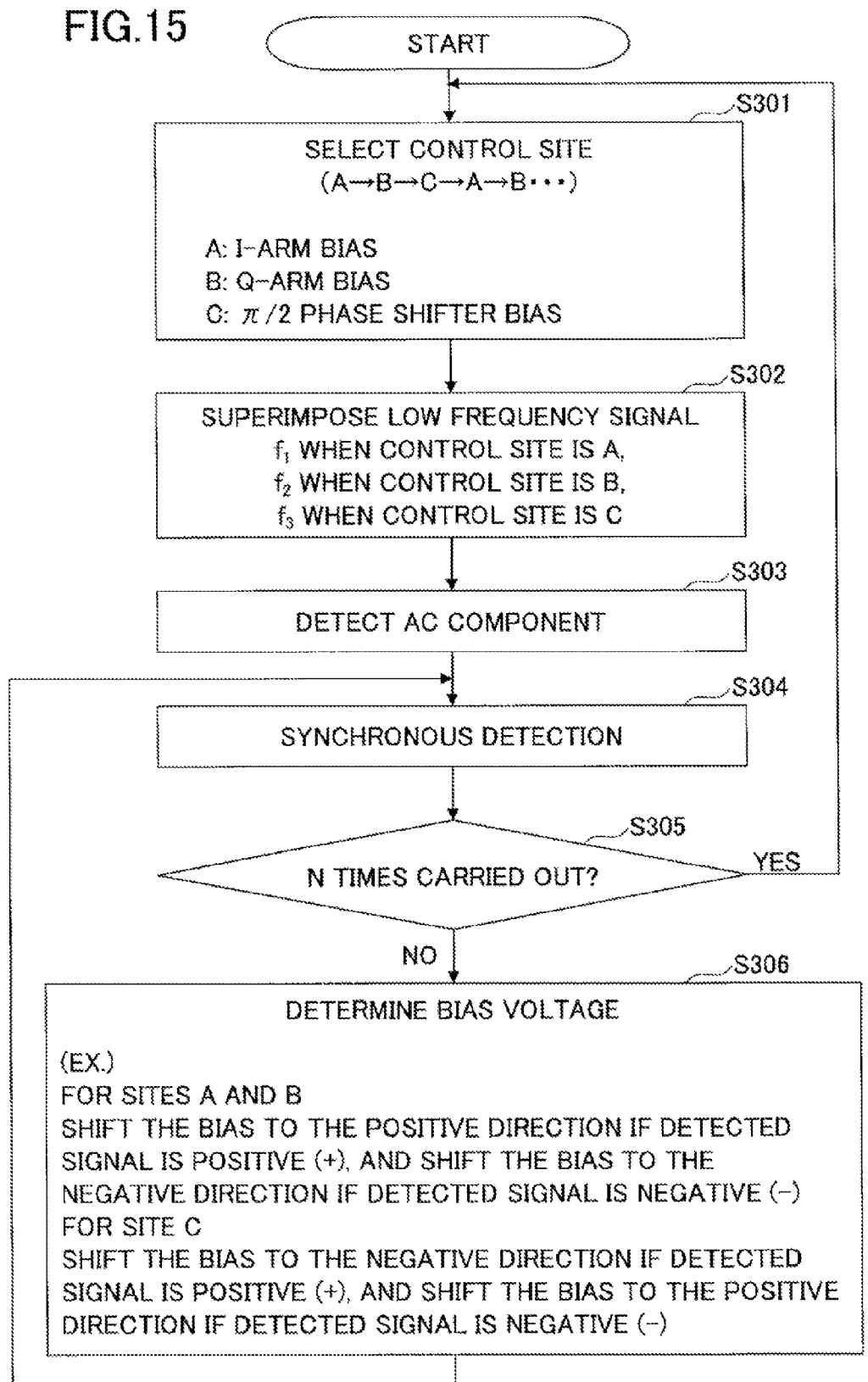
FIG. 15 is a flowchart illustrating a process flow of bias control according to the third embodiment.

FIG. 15 is a flowchart illustrating bias control operations according to the third embodiment. For the sake of convenience, the process for the I-arm bias is called process A, the process for the Q-arm bias is called process B, and the process for the π/2 phase shifter bias is called process C.

When the process starts, the controller 55 selects the I-arm bias (process A) as a control target (S301). The switching controller 56 of the controller 55 controls the switch 57 of the DC bias circuit 53 so as to supply a bias voltage to the I-arm 18I. The switching controller 56 also controls the low-frequency signal generator 52 to generate a low-frequency signal $f_1$ for the I-arm bias. The low-frequency signal $f_1$ generated by the low-frequency signal generator 52 is superimposed on a DC bias (S302). The bias voltage on which the low-frequency signal $f_1$ is superimposed is supplied to the currently controlled I-arm 18I. The AC component is detected from the output signal of the PD 21 by the AC power detector 34 (S303), and the low-frequency signal $f_1$ is extracted as a monitor signal by synchronous detection (S304). Until the value of the detection counts has reached N (NO in S305), the controller 55 determines and updates the bias voltage based upon the monitor signal (S306). If the sign of the monitor signal $f_1$ is positive, the bias is adjusted toward the positive direction. If the sign of the monitor signal $f_1$ is negative, the bias is adjusted toward the negative direction.

When the process has been repeated N times (YES in S305), the controller 55 switches the process to the Q-arm bias control site (process B) (S301). The switching controller 56 of the controller 55 controls the switch 57 of the DC bias circuit 53 so as to supply the bias voltage to the Q-arm 18Q. The switching controller 56 also controls the low-frequency signal generator 52 so as to generate a low-frequency signal $f_2$ for the Q-arm bias. The low-frequency signal $f_2$ generated by the low-frequency signal generator 52 is superimposed on a DC bias (S302). The bias voltage with the low-frequency signal $f_2$ superimposed is supplied to the currently controlled Q-arm 18Q. The AC component is detected from the output signal of the PD 21 by the AC power detector 34 (S303), and the low-frequency signal $f_2$ is detected as a monitor signal by synchronous detection (S304). Until the value of the detection counts has reached N (NO in S305), the controller 55 determines and updates the bias voltage based upon the monitor signal (S306). Determination of the Q-arm bias is the same as that for the I-arm bias.

When the processes has been repeated N times (YES in S305), the controller 55 switches the process to the control site of π/2 phase shifter bias (process C) (S301). The switching controller 56 of the controller 55 controls the switch 57 of the DC bias circuit 53 so as to supply a bias voltage to the π/2 phase shifter 19. The switching controller 56 also controls the low-frequency signal generator 52 so as to generate a low-frequency signal $f_3$. The low-frequency signal $f_3$ generated by the low-frequency signal generator 52 is superimposed on a DC bias (S302). The bias voltage on which the low-frequency signal $f_3$ is superimposed is supplied to the currently controlled π/2 phase shifter 19. The AC component is detected from the output signal of the PD 21 by the AC power detector 34 (S303), and the low-frequency signal $f_3$ is detected as a monitor signal by synchronous detection (S304). Until the value of the detection counts has reached N (NO in S305), the controller 55 determines and updates the bias voltage based upon the monitor signal (S306). In determining bias voltages, bias is adjusted in the negative direction if the sign of the detected monitor signal $f_3$ is positive, and adjusted in the positive direction if the sign of the monitor signal f3 is negative.

When process C for the π/2 phase shifter bias has been repeated N times (YES in S305), the controller 55 switches the control target again to process A (S301).

In this manner, the I-arm bias, the Q-arm bias and the π/2 phase shifter bias are sequentially controlled based upon a change in the low-frequency signals $f_1$, $f_2$ and $f_3$, respectively, contained in the AC component of the modulated light. In the third embodiment, accuracy of monitoring and bias control is further improved by superimposing a low-frequency signal corresponding to each of the control targets.

Figure 16:
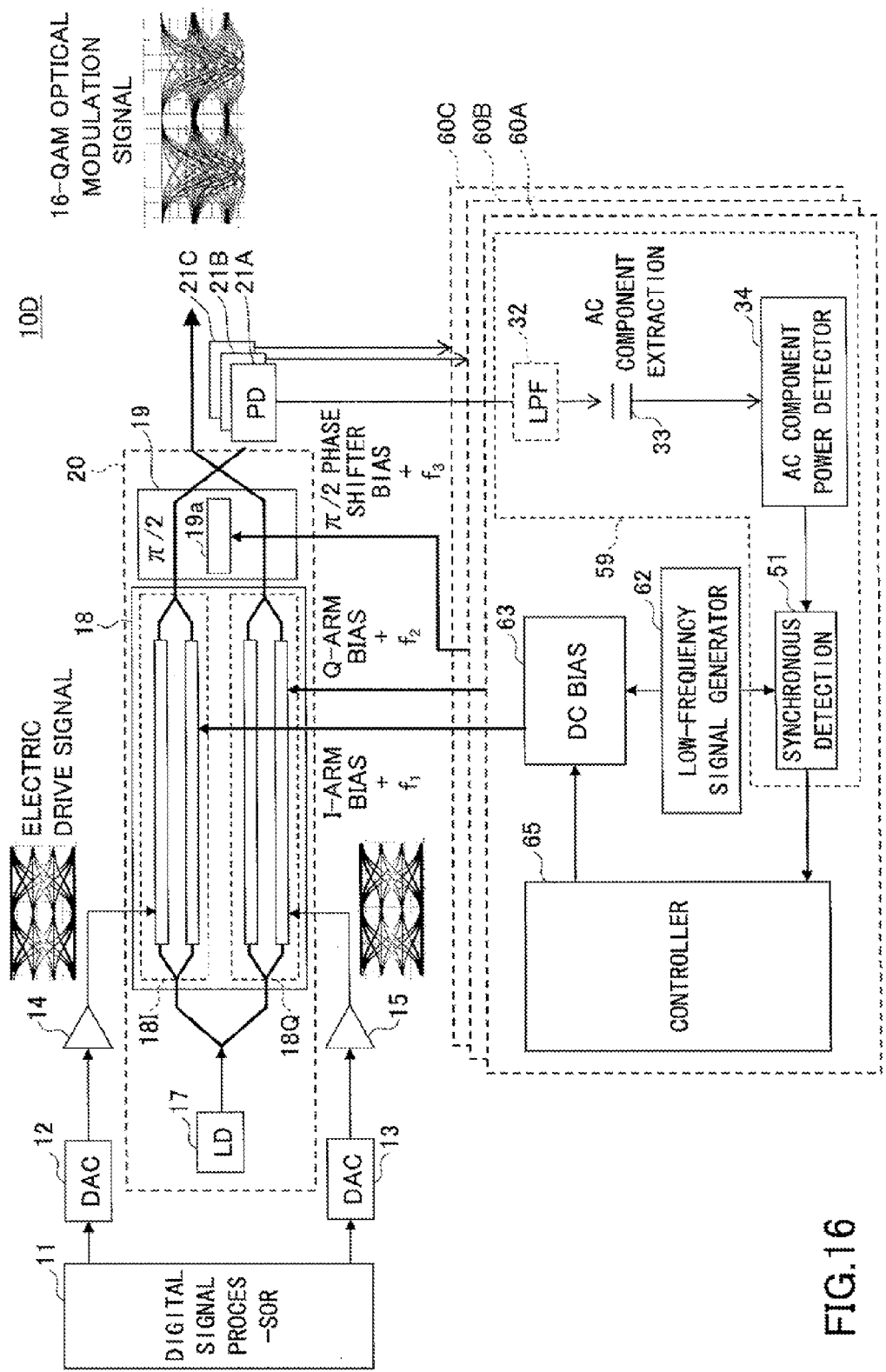
FIG. 16 illustrates a modification of the optical transmitter of the third embodiment.

FIG. 16 illustrates an optical transmitter 10D which is a modification of the third embodiment. In the structure and the method illustrated in FIG. 14 and FIG. 15, the I-arm bias, the Q-arm bias and the π/2 phase shifter bias are controlled in a time-shared manner using a common bias controller 50. In the modification, bias controllers 60A, 60B and 60C are provided corresponding to the I-arm bias, the Q-arm bias and the π/2 phase shifter bias to execute simultaneous operations.

The bias controller 60A for the I-arm bias includes a monitor 59, a controller 65, a DC bias circuit 63 and a low-frequency signal generator 62. The structure and the operations of the monitor 59 is the same as those of the monitor 59 of FIG. 14. The low-frequency signal generator 62 generates a low-frequency signal $f_1$ for the I-arm bias. The generated low-frequency signal $f_1$ is input to the DC bias circuit 63 and the synchronous detector 51. The controller 65 adjusts the I-arm bias based upon a change in the low-frequency component $f_1$ contained in the AC component detected at the synchronous detector 51.

The bias controller 60B for the Q-arm bias has the same construction as that of the I-arm bias controller 60A. A difference is that the low-frequency signal generator 62 generates a low-frequency signal $f_2$ for the Q-arm bias.

The bias controller 60C for the π/2 phase shifter bias has the same structure as those of the bias controllers 60A and 60B. Differences are that a low-frequency signal generator 62 generates a low-frequency signal $f_3$ for the π/2 phase shifter bias, and the direction of the bias adjustment carried out by the controller 65 is opposite to that in the bias controllers 60A and 60B.

Figure 17:
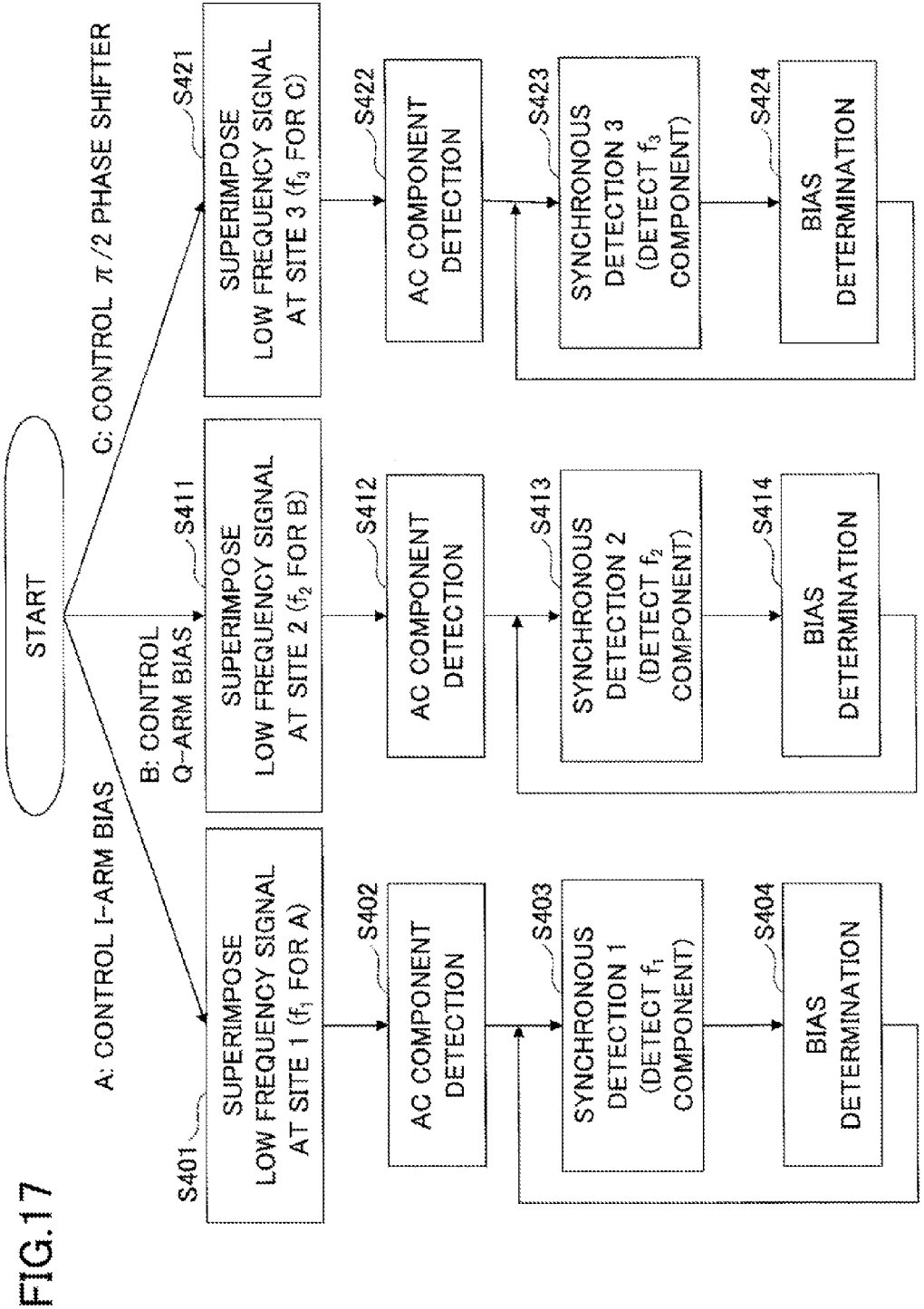
FIG. 17 is a diagram illustrating a process flow of bias control of the modification of the third embodiment.

FIG. 17 illustrates a control flow of the modification of the third embodiment. In the modification, a process for the I-arm bias (process A), a process to the Q-arm bias (process B) and a process to the π/2 phase shifter bias (process C) are executed in parallel.

In the control on the I-arm bias, a low-frequency signal $f_1$ is superimposed to a bias voltage (S401). The AC component is detected from a portion of the output signal from the optical modulation part 20 (S402). The low-frequency signal $f_1$ is detected as a monitor signal by synchronous detection (S403). The controller 65 determines and updates the bias voltage based upon the detected monitor signal (S404). After the bias has been set, steps S403 and S404 are repeated.

In the control on the Q-arm bias, a low-frequency signal $f_2$ is superimposed to a bias voltage (S411). The AC component is detected from a portion of the output signal from the optical modulation part 20 (S412). The low-frequency signal $f_2$ is detected as a monitor signal by synchronous detection (S413). The controller 65 of the corresponding bias controller 60B determines and updates the bias voltage based upon the detected monitor signal (S414). After the bias has been set, steps S413 and S414 are repeated.

In the control on the π/2 phase shifter bias, a low-frequency signal $f_3$ is superimposed onto a bias voltage (S421). The AC component is detected from a portion of the output signal from the optical modulation part 20 (S422). The low-frequency signal $f_3$ is detected as a monitor signal by synchronous detection (S423). The controller 65 of the corresponding bias controller 60C determines and updates the bias voltage based upon the detected monitor signal (S424). After the bias is set, steps S423 and S424 are repeated.

With the arrangement of the modification, it is unnecessary to switch the control targets after the N-times repetition.

As has been described above, in an optical transmitter employing a digital processing technique for modulating light by a multilevel electrical drive signal, stable transmission signal characteristics can be acquired as a whole of the transmission system through the feedback control of the LN modulator making use of a change in the AC component. If the monitor is shared, the circuit size can be maintained compact.

Figure 18:
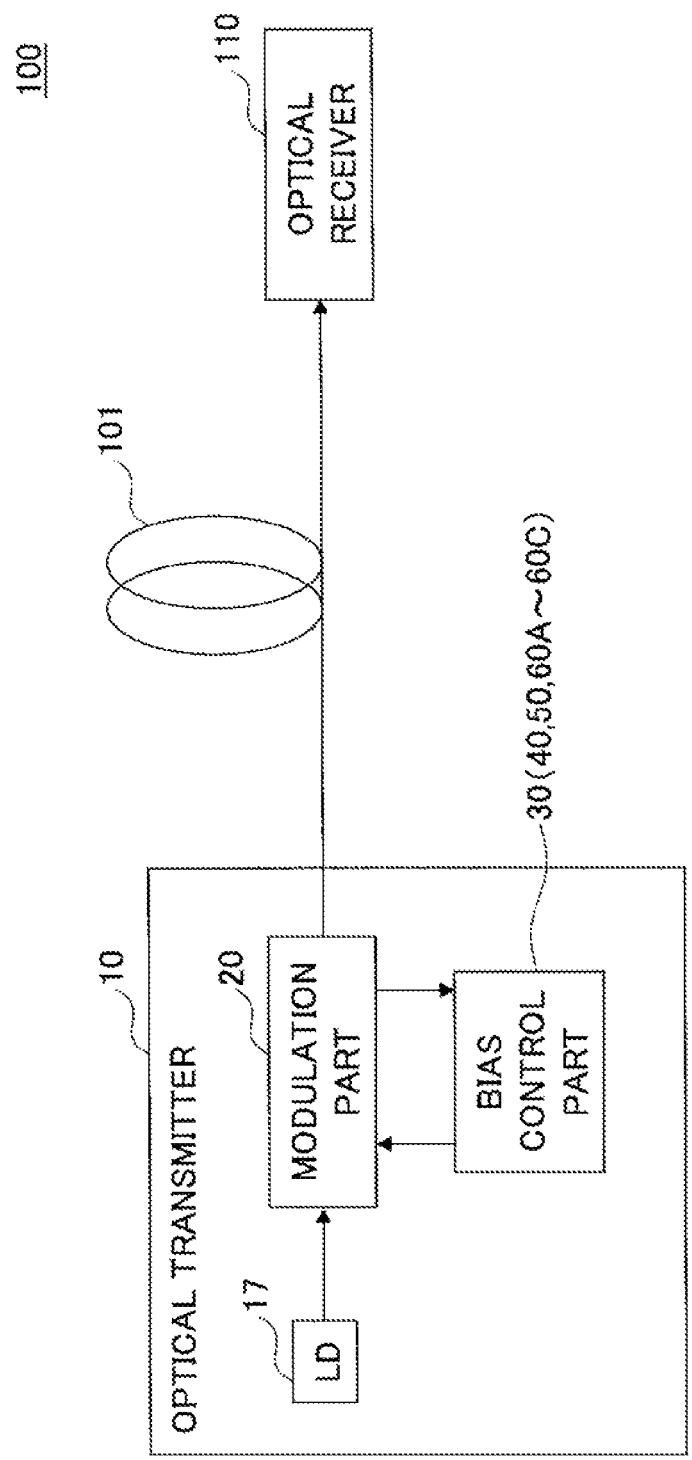
FIG. 18 is a schematic diagram of an optical transmission system using an optical transmitter of the embodiment.

FIG. 18 is a schematic diagram of an optical transmission system 100, using any one of the optional optical transmitters described in the first to the third embodiments. The optical transmission system 100 includes the optical transmitter 10; a transmission path 101 that transmits a modulated signal output from the optical transmitter 10; and an optical receiver 110 that receives the modulated signal through the transmission path. The optical transmitter 10 has a light source 17; a modulation part 20 that performs phase modulation on a light irradiated from the light source by using a modulated drive signal having 2*n intensive levels (n is an integer equal to or greater than 1); and a bias control part 30 (or 40, 50, 60A-60C) that controls the bias voltage given to the modulation part 20. Operations of the bias control part 30 (or 40, 50, 60A-60C) are the same as those described in the first, the second, and the third embodiments.

The transmission path 101 is formed of appropriate optical fibers such as silica fibers, plastic fibers, etc. The optical receiver 110 separates a received optical signal into respective modulation components, and converts them into electric signals (although these components are not illustrated in the figure). The electric signals are subjected to analog-to-digital conversion and then demodulated by digital signal processing. By applying the configurations of the first, the second and the third embodiments to the optical transmitter 10, stable transmission signal characteristics can be achieved for an optical transmission system employing multilevel modulation such as 16-QAM, 64-QAM, etc.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:
1. An optical transmitter comprising:
an optical modulator including a first waveguide and a second waveguide and configured to modulate carrier light with a modulation driving signal having 2*n intensity levels (where n is an integer 1 or greater) at each of the first and second waveguides;

a phase shifter configured to cause a predetermined phase difference between a first optical signal output from the first waveguide and a second optical signal output from the second waveguide;

a photodetector configured to detect a portion of a multi-level optical modulation signal acquired by combining the first optical signal and the second optical signal having the phase difference and perform optical-to-electrical conversion on the detected modulation signal;

a monitor configured to detect an integrated power spectrum of an alternating current component in the detected modulation signal; and a controller configured to control at least one of a first bias voltage being supplied to the first waveguide and a second bias voltage being supplied to the second waveguide, independently from a third bias voltage being supplied to the phase shifter, so as to increase a power value of the integrated power spectrum of the alternating current component.

2. The optical transmitter according to claim 1, wherein the controller further controls the third bias voltage being supplied to the phase shifter so as to decrease the power value of the integrated power spectrum of the alternating current component, and wherein the controller controls the first bias voltage, the second bias voltage, and the third bias voltage simultaneously or in a time-shared manner.

3. The optical transmitter according to claim 1, further comprising:

a low-frequency signal generator configured to generate a low-frequency signal; and a bias circuit configured to generate the first bias voltage and the second bias voltage by superimposing the low-frequency signal on a direct current voltage, wherein the monitor is configured to detect the low-frequency signal contained in the alternative current component, and the controller is configured to control at least one of the first bias voltage and the second bias voltage so as to bring the detected low-frequency signal level closer to zero.

4. The optical transmitter according to claim 3, wherein the low-frequency signal generator generates a single frequency to be superimposed in common on the first bias voltage and the second bias voltage.

5. The optical transmitter according to claim 3, wherein the low-frequency signal generator generates a first low-frequency signal to be superimposed on the first bias voltage and a second low-frequency signal to be superimposed on the second bias voltage, the monitor detects the first low-frequency signal contained in the alternating current component and the second low-frequency signal contained in the alternating current component, and the controller controls the first bias voltage so as to bring the detected first low-frequency signal level closer to zero, and controls the second bias voltage so as to bring the detected second low-frequency signal level closer to zero.

6. The optical transmitter according to claim 1, wherein the controller switches between control on the first bias voltage being supplied to the first waveguide and on the second bias voltage being supplied to the second waveguide.

7. The optical transmitter according to claim 1, wherein the controller and the monitor are provided for each of control sites of the first bias voltage and the second bias voltage to carry out the control on the first bias voltage and the second bias voltage in parallel.

8. The optical transmitter according to claim 2, further comprising:

a low-frequency signal generator configured to generate a low-frequency signal, and a bias circuit configured to generate the first bias voltage, the second bias voltage and the third bias voltage by superimposing the low-frequency signal on a direct current voltage, wherein the monitor detects the low-frequency signal contained in the alternating current component, and the controller controls the first bias voltage, the second bias voltage and the third bias voltage so as to bring the detected low-frequency signal level closer to zero.

9. The optical transmitter according to claim 8, where the controller causes the first bias voltage or the second bias voltage to change in a positive direction, while changing the third bias voltage in a negative direction, if the detected low-frequency component is positive, and causes the first bias voltage or the second voltage to change in the negative direction, while changing the third bias voltage in the positive direction, if the detected low-frequency component is negative.

10. The optical transmitter according to claim 8, wherein the low-frequency generator generates a single frequency to be superimposed in common on the first bias voltage, the second bias voltage and the third bias voltage.

11. The optical transmitter according to claim 8, wherein the low-frequency signal generator generates a first low-frequency signal to be superimposed on the first bias voltage, a second low-frequency signal to be superimposed on the second bias voltage, and a third low-frequency signal to be superimposed on the third bias voltage, the monitor detects the first low-frequency signal, the second low-frequency signal, and the third low-frequency signal contained in the alternating current component, and the controller controls the third bias voltage so as to bring the detected third low-frequency signal level closer to zero.

12. An optical transmission system comprising:

an optical transmitter according to claim 1;

a transmission path for transmitting a modulation signal output from the optical transmitter; and an optical receiver to receive the modulation signal via the transmission path.

13. A method for controlling an optical transmitter, comprising:

modulating light propagating through a first waveguide and a second waveguide of an optical modulator by a modulation driving signal with 2*n intensity levels (where n is an integer 1 or greater), providing a predetermined phase different between a first optical signal output from the first waveguide and a second optical signal output from the second waveguide, detecting a portion of a multilevel optical modulation signal acquired by combining the first optical signal and the second optical signal having the phase difference to perform optical-to-electrical conversion on the detected modulation signal, detecting an integrated power spectrum of an alternating current component in the detected modulation signal, and controlling at least one of a first bias voltage being supplied to the first waveguide and a second bias voltage being supplied to the second waveguide, independently from a third bias voltage being supplied to a phase shifter of the optical transmitter, so as to increase a power value of the detected integrated power spectrum of the alternating current component.

14. The method according to claim 13, further comprising:
controlling the third bias voltage being supplied to the phase shifter of the optical transmitter so as to decrease the power value of the detected integrated power spectrum of the alternating current component,
wherein the first bias voltage being supplied to the first waveguide, the second bias voltage being supplied to the second waveguide and the third bias voltage being supplied to the phase shifter are controller simultaneously or in a time-shared manner.

15. The method according to claim 13, further comprising;
generating the first bias voltage and the second bias voltage by superimposing a low-frequency signal on a direct current voltage,
detecting the low-frequency signal contained in the alternating current component, and
controlling at least one of the first bias voltage and the second bias voltage so as to bring the detected low-frequency signal level closer to zero.

16. The method according to claim 13, wherein the low-frequency signal is used in common between the first bias voltage and the second bias voltage.

17. The method according to claim 13, further comprising:
generating a first low-frequency signal to be superimposed on the first bias voltage and a second low-frequency signal to be superimposed on the second bias voltage,
detecting the first low-frequency signal contained in the alternating current component to control the first bias voltage so as to bring the detected first low-frequency signal level closer to zero, and
detecting the second low-frequency signal contained in the alternating current component to control the second bias voltage so as to bring the detected second low-frequency signal level closer to zero.

18. The method according to claim 14, further comprising:
generating the first bias voltage, the second bias voltage and the third bias voltage by superimposing a low-frequency signal on a direct current voltage,
detecting the low-frequency signal contained in the alternating current component, and
controlling the first bias voltage, the second bias voltage and the third bias voltage so as to bring the detected low-frequency signal level closer to zero.

19. The method according to claim 18, wherein the first bias voltage and the second bias voltage are changed in a positive direction, while the third bias voltage is changed in a negative direction, if the detected low-frequency signal is positive, and the first bias voltage and the second bias voltage are changed in the negative direction, while the third bias voltage is changed in the positive direction, if the detected low-frequency signal is negative.

* * * * *